(12) United States Patent
Gleeson et al.

(10) Patent No.: US 10,007,691 B2
(45) Date of Patent: Jun. 26, 2018

(54) PRIORITIZING REPOPULATION OF IN-MEMORY COMPRESSION UNITS

(71) Applicant: Oracle International Corporation, Redwood Shores, CA (US)

(72) Inventors: Michael J. Gleeson, Saratoga, CA (US); Jesse Kamp, Castro Valley, CA (US); Vineet Marwah, San Ramon, CA (US); Tirthankar Lahiri, Palo Alto, CA (US); Juan R. Loaiza, Woodside, CA (US); Sanket Hase, Mountain View, CA (US); Niloy Mukherjee, San Jose, CA (US); Sujatha Muthulingam, San Ramon, CA (US); Atrayee Mullick, Santa Clara, CA (US); Allison L. Holloway, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 304 days.

(21) Appl. No.: 14/823,393

(22) Filed: Aug. 11, 2015

(65) Prior Publication Data

US 2016/0085834 A1    Mar. 24, 2016

Related U.S. Application Data

(60) Provisional application No. 62/054,970, filed on Sep. 24, 2014.

(51) Int. Cl.
*G06F 17/30* (2006.01)
(52) U.S. Cl.
CPC .. *G06F 17/30339* (2013.01); *G06F 17/30377* (2013.01); *G06F 17/30578* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0135585 A1* | 9/2002 | Dye | ......................... | G06T 1/60 345/531 |
| 2007/0061485 A1* | 3/2007 | Horton | ................ | H04L 29/1232 709/245 |
| 2007/0061544 A1* | 3/2007 | Uppala | ............. | G06F 17/30315 711/173 |
| 2011/0066605 A1* | 3/2011 | Elbaz | ................ | G06F 17/30554 707/705 |
| 2012/0030428 A1* | 2/2012 | Yasufuku | ............ | G06F 12/0804 711/122 |

* cited by examiner

*Primary Examiner* — Etienne Leroux
(74) *Attorney, Agent, or Firm* — Hickman Palermo Becker Bingham LLP

(57) ABSTRACT

To prioritize repopulation of in-memory compression units (IMCU), a database server compresses, into an IMCU, a plurality of data units from a database table. In response to changes to any of the plurality of data units within the database table, the database server performs the steps of: (a) invalidating corresponding data units in the IMCU; (b) incrementing an invalidity counter of the IMCU that reflects how many data units within the IMCU have been invalidated; (c) receiving a data request that targets one or more of the plurality of data units of the database table; (d) in response to receiving the data request, incrementing an access counter of the IMCU; and (e) determining a priority for repopulating the IMCU based, at least in part, on the invalidity counter and the access counter.

25 Claims, 11 Drawing Sheets

TABLE 200

|  | C1 | C2 | C3 |
|---|---|---|---|
| R1 | R1C1 | R1C2 | R1C3 |
| R2 | R2C1 | R2C2 | R2C3 |
| R3 | R3C1 | R3C2 | R3C3 |
| R4 | R4C1 | R4C2 | R4C3 |
| R5 | R5C1 | R5C2 | R5C3 |
| R6 | R6C1 | R6C2 | R6C3 |

FIG. 2A

PRIORITIZING REPOPULATION OF IN-MEMORY COMPRESSION UNITS

FIELD OF THE INVENTION

The present disclosure relates to database systems and, more specifically, to managing database objects that reside in memory in one format and on disk in another format.

BACKGROUND

Different data formats have different benefits. Therefore, techniques have been developed for maintaining data persistently in one format, but making that data available to a database server in more than one format. For example, in a dual-format database system, one of the formats in which the data is made available for query processing is based on the on-disk format, while another of the formats in which the data is made available for query processing is independent of the on-disk format.

The format that corresponds to the on-disk format is referred to herein as the "persistent format" or "PF". Data that is in the persistent format is referred to herein as PF data. An in-memory format that is independent of the on-disk format is referred to as a "mirror format" or "MF". Data that is in the mirror format is referred to herein as MF data. For example, in one embodiment, the persistent format is row-major disk blocks, and the mirror format is a column-major format. Such a dual-format database system is described in U.S. patent application Ser. No. 14/337,179, entitled MIRRORING, IN MEMORY, DATA FROM DISK TO IMPROVE QUERY PERFORMANCE (hereinafter the "Mirroring Application"), the contents of which are incorporated herein by this reference.

As explained in the Mirroring Application, the mirror format is completely independent of the persistent format. However, the MF data is initially constructed in memory based on the persistently stored PF data, not based on any persistent MF structures. Since persistent MF structures are not required, users of existing databases need not migrate the data or structures in their existing databases to another format. Thus, a conventional database system that uses row-major disk blocks may continue to use those disk blocks to persistently store its data without performing any data migration, while still obtaining the performance benefit that results from having a column-major representation of the data available in volatile memory.

In some embodiments, the MF data is compressed. The compression can be performed at various compression levels, either specified by the user or based on access patterns. In an embodiment in which the MF data is compressed, the MF data may be organized, within volatile memory 102, into "in-memory compression units" (IMCUs).

In one embodiment, when a data item is updated, the copy of the data item in the PF data is updated, but the copy of the data item in the MF data is not. Specifically, the data item copies that are in IMCUs are not updated in response to updates because the overhead involved in decompressing the IMCU, updating the contents thereof, and then recompressing the IMCU could significantly reduce system performance. Instead, those data items are marked as "invalid" within the IMCU, and the updates to the data items are stored outside the IMCU. Consequently, as more and more updates are made to data items contained in an IMCU, the IMCU becomes increasingly stale. The more stale an IMCU, the less efficient it is to use the IMCU, because the current values of the invalid items need to be obtained from another source, such as a journal, the buffer cache, or the on-disk PF data.

Rather than let IMCUs become so stale that they no longer improve database performance, the IMCUs can periodically be "repopulated". Repopulating an IMCU, which is also referred to as "refreshing" or "merging", involves reconstructing the IMCU with more current data. Thus, to repopulate an IMCU that contains columns c1, c2 and c3 for table emp, the database server would have to obtain all of the current values from c1, c2 and c3, organize those values in column vectors, compress the column vectors, and then package the compressed column vectors into an IMCU. Various techniques for repopulating an IMCU are described in detail in U.S. patent application Ser. No. 14/337,045, entitled GRANULAR CREATION AND REFRESH OF COLUMNAR DATA, the contents of which are incorporated herein by reference.

Unfortunately, repopulating IMCUs incurs a significant amount of overhead, both in terms of CPU usage and memory consumption. Consequently, a repopulation strategy that attempts to keep all IMCUs as fresh as possible is likely to incur an excessive amount of overhead, leading to performance reduction rather than performance improvement. On the other hand, a repopulation strategy that allows IMCUs to become and remain largely stale for long periods of time would significantly reduce the performance benefit of having IMCUs in the first place.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2a is a block diagram of a table used for examples;

DETAILED DESCRIPTION

Figure 1:
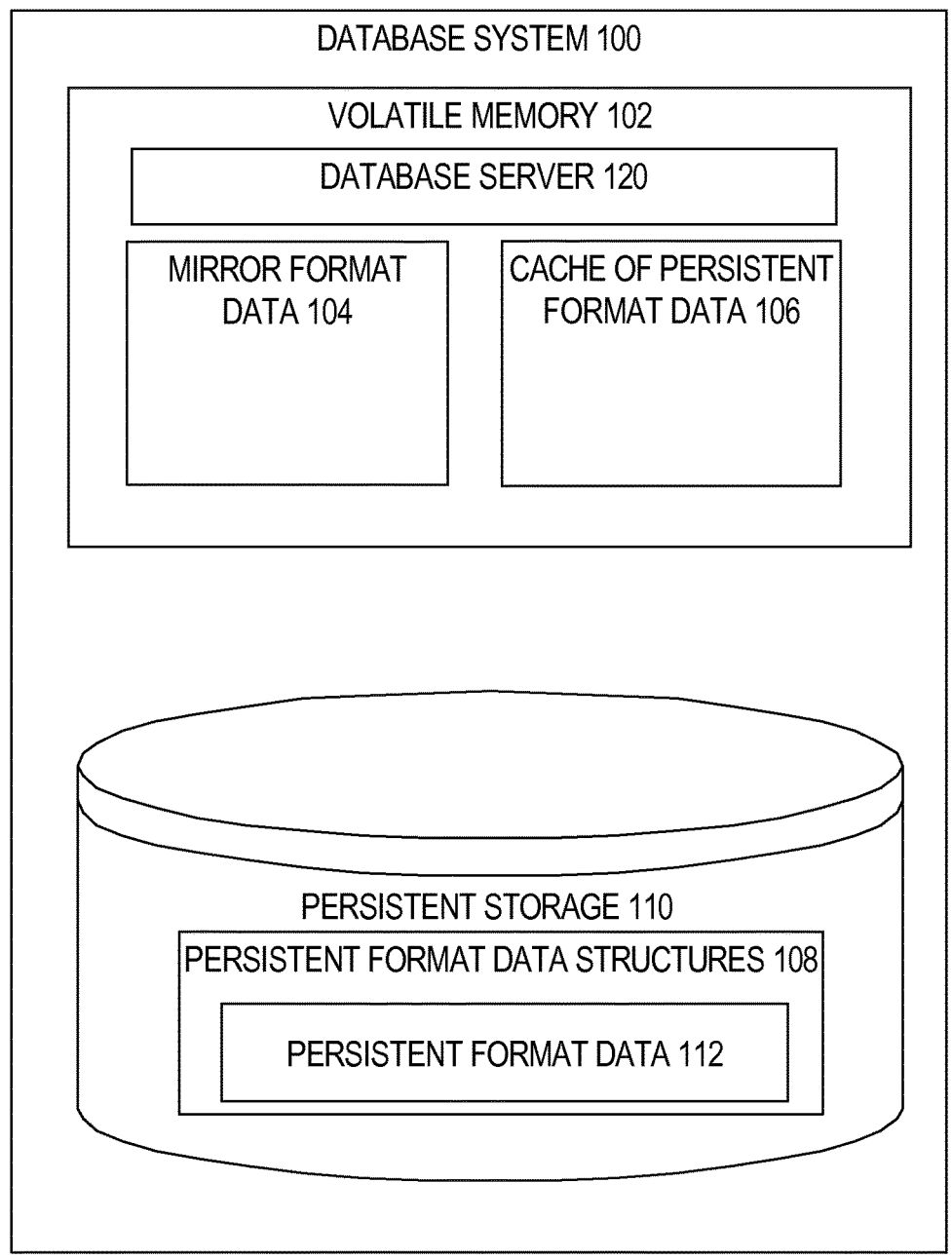
FIG. 1 is a block diagram of a database system that concurrently maintains mirror format data in volatile memory and persistent format data on persistent storage, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for implementing IMCU repopulation strategies that balance the need to prevent IMCUs from becoming too stale, with the need to minimize the performance hit incurred by IMCU repopulation operations. According to one embodiment, to minimize the impact on database performance, repopulation operations are not performed on all IMCUs at the same time. Rather, techniques are described herein for repopulating IMCUs in a prioritized fashion.

According to one embodiment, to prioritize IMCU repopulation operations, the database server that hosts an IMCU responds to changes to any of the plurality of data units in the IMCU by performing the steps of: invalidating corresponding data units in the IMCU, and incrementing an invalidity counter of the IMCU that reflects how many data units within the IMCU have been invalidated. In addition, in response to receiving a data request that targets one or more of the plurality of data units in the IMCU, the database server increments an access counter of the IMCU. For any given IMCU, the priority for repopulating the IMCU is determined by the database server based, at least in part, on the invalidity counter and the access counter for that IMCU.

In one embodiment, a queue is maintained for performing IMCU repopulate operations. Each queue entry in the queue represents an IMCU, and the order of the entries in the queue indicates the order in which the corresponding IMCUs are to be repopulated. In such an embodiment, the database server assigns an IMCU a priority, inserts a queue entry for the IMCU into the priority queue at a position that is based on the priority, and repopulates IMCUs in an order that is based on order of queue entries in the priority queue.

In an embodiment, the priority that the database server assigns to a given IMCU is based on a ratio of (a) a repopulation benefit to (b) a repopulation cost. The cost/benefit values may be based, for example, on an uncompressed size of all data within the IMCU and a ratio of the uncompressed size to a repopulation speed.

While examples shall be given hereafter in which the mirror format is columnar, the mirror format may be any format, different from the persistent format, that is useful for processing queries. For example, in an alternative embodiment, the PF format is column-major, while the MF format is row-major. Regardless of the particular mirror format used, the mirror format data is created in volatile memory with data items that are obtained from existing PF structures (e.g. tables and indexes) without causing a change to the format of those structures.

General Architecture

FIG. 1 is a block diagram of a database system according to one embodiment. Referring to FIG. 1, database system 100 includes volatile memory 102 and persistent storage 110. Volatile memory 102 generally represents the random access memory used by the database system, and may be implemented by any number of memory devices. Typically, data stored volatile memory 102 is lost when a failure occurs.

Persistent storage 110 generally represents any number of persistent storage devices, such as magnetic disks, FLASH memory, and/or solid state drives. Unlike volatile memory 102, data stored on persistent storage 110 is not lost when a failure occurs. Consequently, after a failure, the data on persistent storage 110 may be used to rebuild the data that was lost in volatile memory 102.

Within volatile memory 102, a database server 120 is executing database commands that are submitted to the database server by one or more database applications (not shown). The data used by those applications is illustrated as PF data 112. PF data 112 resides on persistent storage device 110 in PF data structures 108. The PF structures 108 may be, for example, row-major disk blocks. While row-major disk blocks are used for the purposes of illustration, the PF structures may take any form, such as column-major disk block, hybrid compression units where some data is arranged in column-major format and other data is arranged in row-major format, etc.

The volatile memory 102 further includes a cache 106 of PF data. Within cache 106, the data is stored in a format that is based on the format in which the data resides within the PF data structures 108. For example, if the persistent format is row-major disk blocks, then cache 106 may contain cached copies of row-major disk blocks.

On the other hand, MF data 104 is in a format that is unrelated to the persistent format. For example, in the case where the persistent format is row-major disk blocks, the mirror format may be column-major compression units. Because the mirror format differs from the persistent format, the MF data 104 is produced by performing transformations on the PF data. These transformations occur both when volatile memory 102 is initially populated with MF data 104 (whether at start-up or on-demand), and when volatile memory 102 is re-populated with MF data 104 after a failure.

Significantly, the existence of MF data 104 may be transparent to the database applications that submit database commands to the database server that makes use of the MF data 104. For example, those same applications, designed to interact with database systems that operate exclusively on PF data 112, may interact without modification with a database server that maintains MF data 104 in addition to the PF data 112. Further, transparent to those applications, that database server may use the MF data 104 to more efficiently process some or all of those database commands.

The Mirror Format Data

MF data 104 may mirror all of the PF data 112, or a subset thereof. In one embodiment, a user may specify what portion of the PF data 112 is "in-memory enabled". The specification may be made at any level of granularity. For example, the specification of what is in-memory enabled may be made at least at the following levels of granularity:

the entire database
specified tables
specified columns
specified row ranges
specified partitions
specified segments
specified extents As shall be described hereafter, in-memory enabled data is converted to the mirror format and stored as MF data 104 in volatile memory. Thus, when in-memory enabled data is required by a query, the database server has the option of providing the data from either the PF data 112 or the MF data 104. The conversion and loading may occur at the time the database is started, or in a lazy or on-demand fashion. Data that is not in-memory enabled is not mirrored in the MF data 104. Consequently, when such data is required by a query, the database server does not have the option of obtaining the data from the MF data 104.

For the purpose of explanation, it shall be assumed that PF data structures 108 include the table 200 illustrated in FIG. 2A. Table 200 includes three columns c1-c3, and six rows r1-r6. While the illustration of table 200 in FIG. 2A portrays how the data is logically organized on persistent storage 110, the actual format in which the data is physically stored may be quite different.

Figure 2B:
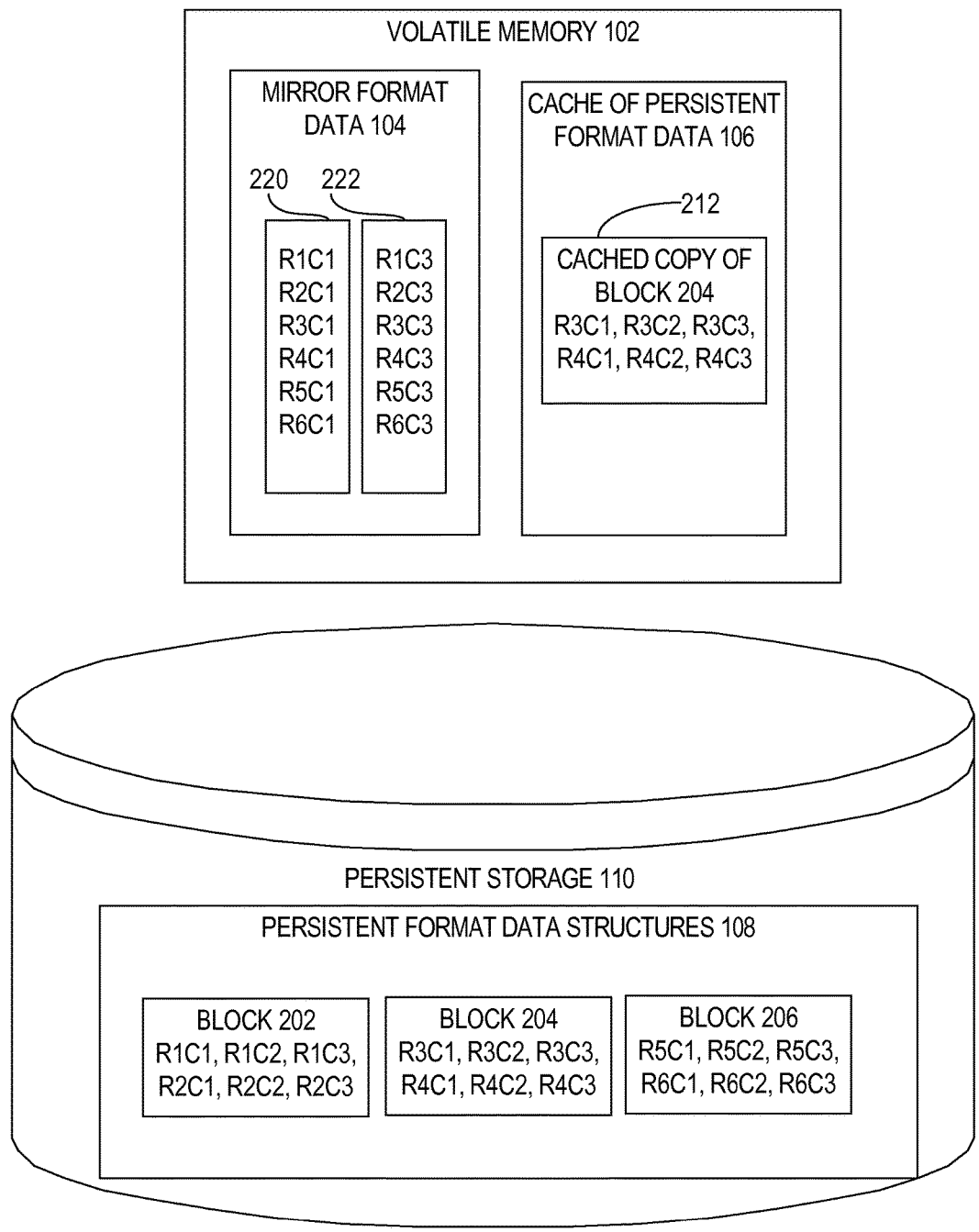
FIG. 2b is a block diagram of how data items for a table may be concurrently maintained in two formats, one of which is an in-memory format, according to an embodiment.

Specifically, referring to FIG. 2B, it illustrates how the data that resides in table 200 may be physically organized on persistent storage 110. In the present example, the data for table 200 is stored in three row-major disk blocks 202, 204 and 206. Block 202 stores the values for all columns of row r1, followed by the values for all columns of row r2. Block 204 stores the values for all columns of row r3, followed by the values of all columns of row r4. Finally, block 206 stores the values of all columns of row r5, followed by the values of all columns of row r6.

Copies of some of those disk blocks may be temporarily stored in cache 106. In the example illustrated in FIG. 2B, a cached copy 212 of block 204 resides in cache 106. Cache 106 may be managed using any one of a variety of cache management techniques, and the embodiments described herein are not limited to any particular cache management technique. In general, such techniques attempt to retain in volatile memory 102 copies of the disk blocks that are most likely to be requested in the near future. Consequently, when cache 106 runs out of space, cached copies of disk blocks that are less likely to be requested are replaced by copies of blocks that are more likely to be requested.

In contrast to the data in cache 106, the mirror format data 104 is not formatted in a manner that is based on the persistent format. In the illustrated example, mirror format data 104 includes two column vectors 220 and 222. Each column vector stores a contiguous series of values from a single column of table 200. In the present example, column vector 220 stores values from column 1 of table 200, and column vector 222 stores values from column 3 of table 300. In this example, the MF data 104 mirrors a subset of the PF data because MF data 104 does not include column vectors for column 2 of table 200.

Organization of the MF Data

According to one embodiment, even though the MF data uses a different format than the PF data, the MF data is organized in a manner that corresponds to the organization of the PF data. For example, on persistent storage 110, the PF data may be stored in blocks that reside in extents which, in turn, are organized into segments. Under these circumstances, within volatile memory 102, the MF data 104 may be organized based on the extents and/or segments to which the data belongs. Thus, column vector 220 may be divided into vector portions, each of which corresponds to a particular range of extents and/or segments.

Within the extents, data is typically ordered by rowid. Similarly, in one embodiment, the MF data 104 is ordered based on rowid. For example, the values in column vector 220 are ordered based on the same rowids that are used to order the PF data in blocks 202, 204 and 206. Specifically, rowid r1 immediately precedes rowid r2, so r1c1 immediately precedes r2c1 in column vector 220, and r1c1 to r1c3 immediately precede r2c1 to r2c3 in block 202.

In alternative embodiments, some or all of the data items in the MF data 104 are not ordered, within the MF data 104, by rowid. Storing the data items in a different order may be useful, for example, if the different ordering produced significantly better compression. As another example, the column vectors may initially be ordered by rowid. However, when new updates are "merged into" the column vectors (as shall be discussed in greater detail hereafter), the updated values may appended to the end of the existing column vectors to avoid having to decompress and recompress the existing column vectors.

When the data items within the column vectors are not in rowid order, an in-memory index may be built on rowid to quickly locate within the MF data 104 the data items associated with any given rowid.

Figure 3:
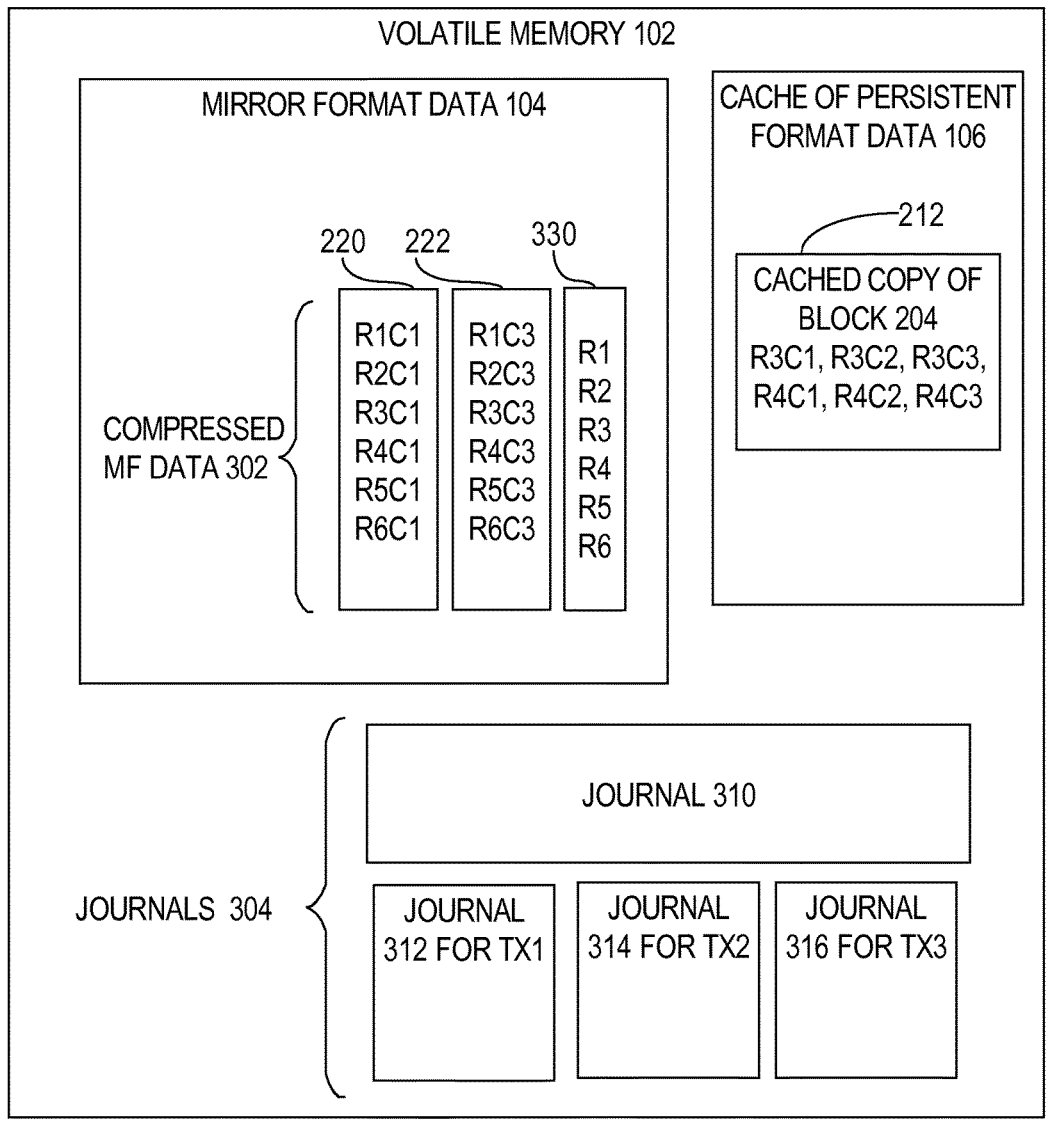
FIG. 3 is a block diagram that illustrates journals stored in volatile memory in conjunction with mirror format data, according to an embodiment.

Whether or not the data items within the column row vectors are ordered based on rowid, a rowid-to-item mapping may be established by maintaining a vector of rowids in conjunction with the column vectors. For example, FIG. 3 illustrates a rowid vector 330 that is maintained in addition to the column vectors 220 and 222. The first value (R1) in the vector of rowids is the rowid of the first data item in each of the column vectors. Similarly, the second value in the vector of rowids (R2) is the rowid of the second data item in each of the column vectors.

In embodiments where the organization of the MF data corresponds to the organization of the PF data, it is easier for the database server to split database operations between the MF data and the PF data. For example, the database server may determine that the MF data is to be used to satisfy a query relative to one range of extents (e.g. extent 1 to extent 10), while PF data is to be used to satisfy the query relative to another range of extents (e.g. extent 11 to extent 20).

Using the MF Data to Satisfy Queries

A conventional database system may operate normally by responding to every query by first searching for the requested data in cache 106. If the data is in cache 106, the data is accessed from cache 106. Otherwise, the needed data is loaded from PF data structures 108 into cache 106, and then accessed from cache 106. However, because the data in both cache 106 and PF data structures 108 is in the persistent format, performing operations based exclusively on the PF data does not always provide the best performance.

Therefore, according to one embodiment, the database server uses the MF data 104 to supply data items required by at least some requested database operations. For example, if a database query requests the values from column 1 of all rows, the database server may obtain those values from the column vector 220 without accessing persistent storage 110. In the absence of MF data 104, the database would only be able to obtain R3C1 and R4C1 without accessing persistent storage 110 (because currently only block 204 is in cache

106). To obtain R1C1 and R2C1, block 202 must be loaded into cache 106, and to obtain R5C1 and R6C1, block 206 must be loaded into cache 106. The time it would take to load blocks 202 and 206 into cache would be significantly more than the time required to obtain the values directly from column vector 220.

Using the MF Data to Evaluate Predicates

Even in situations where the data required by a database operation is not included in the mirror format data 104, the mirror format data 104 may be used to evaluate predicates, and thereby speed up the database operations in the same manner as conventional indexes. For example, assume that table 200 has thousands of rows, and in only three of those rows does column c1 have the value "joe". Under these circumstances, a database server may receive a database command that requests the values, from column c2, of all rows where c1="joe".

In this example, the data that needs to be returned by the database command is from column c2, which is not in the MF data 104. However, the column vector 220 for column 1 may be used to quickly identify the three rows where c1="joe". This operation can be performed efficiently because the data items required to evaluate the predicate (values from c1) are stored contiguously in volatile memory. Once those rows have been identified using column vector 220, the database server may retrieve from disk only those blocks needed to obtain the data from those three rows.

Without using the MF data, a conventional index built on column c1 may be used to evaluate the predicate "where c1=joe". However, some disk I/O may be necessary to use of the conventional index to perform this evaluation, whereas no disk I/O is needed to evaluate the predicate using column vector 220. Further, maintaining such an index can incur significant overhead.

Without using mirror format data 104 or a conventional index, the database server would have to load from persistent storage 110 every disk block that (a) is not already in cache 106, and (b) stores data for table 200. These blocks would have to be loaded merely to compare the values of column c1 against "joe" to identify the three rows for which c2 is required by the database command.

Because MF data 104 may be used for the same function as conventional indexes (i.e. to efficiently identify which rows satisfy criteria specified in a database command), a database system that uses MF data 104 need not have as many conventional indexes as would otherwise be necessary for efficient predicate evaluation. For example, if the MF data 104 includes a column vector for c1 and a column vector for c3, then the database server need not maintain conventional indexes for columns c1 or c3. By reducing the number of conventional indexes that need to be maintained by a database server, the overhead associated with making updates may be significantly reduced.

In-Memory Indexes

As explained above, when a predicate references a column, the column vector for that column may be used to evaluate the predicate. In this way, column vectors may be used instead of conventional indexes. To provide even faster predicate evaluation, in-memory indexes may be used. An in-memory index is an index stored entirely within volatile memory. The nature of the in-memory index may vary based on the characteristics of the data being indexed. For example, if low-cardinality keys are being indexed, the in-memory index may be a binary index. If high-cardinality keys are being indexed, then the in-memory index may be a B-tree. Regardless of the nature of the in-memory index, the entries in the index point to in-memory location of the data items in question, rather than on-disk locations.

Compression

As mentioned above, the MF data may be compressed. However, according to one embodiment, not all MF data need be compressed in the same way, or to the same degree. For example, if it is determined that the data from column c1 of table 200 is used frequently, and the data from column c3 is used infrequently, then the data in column vector 220 may be lightly compressed, or uncompressed, whereas the data in column vector 222 is highly compressed.

The compression algorithm, and the level of compression used by the algorithm, that is used to compress each portion of the MF data may be specified by a user, or may be determined automatically by a database server based on various factors. Possible compression algorithms include, but are not limited to, dictionary-based compression, run-length encoding (RLE), Ozip compression, etc.

The factors used by the database server to determine how each portion of MF data is compressed may include, for example, the frequency with which each portion is accessed, and how much data is in the portion, and how much volatile memory is available. In general, the more frequently a portion of the MF data is accessed, the less compressed the data. As another general rule, the less volatile memory that is available to store the MF data and/or the larger the size of the portion of the MF data, the higher the compression.

Even though data items may be compressed within the MF data, it may not be necessary to decompress the MF data to use it. For example, vector processing operations may be performed directly on compressed values, as described in U.S. patent application Ser. No. 13/708,054, filed Dec. 7, 2012, the entire contents of which are incorporated herein by reference. As also described in that application, it is also possible for the decompression to be performed on-chip after the compressed column vector values have been transferred to the CPU.

In-Memory Compression Units (IMCUS)

Figure 4:
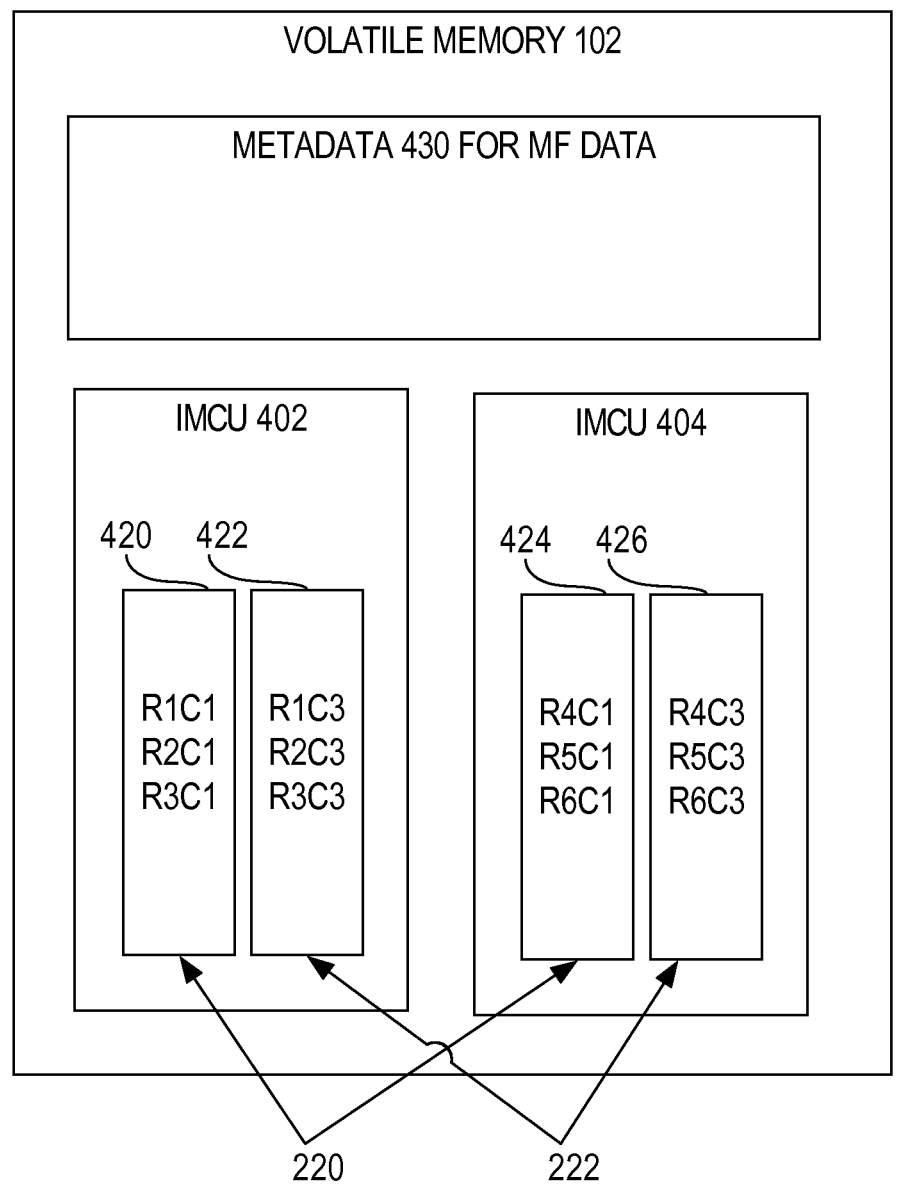
FIG. 4 is a block diagram illustrating how the data from a single table may be divided between IMCUs based on row ranges, according to an embodiment.

As mentioned above, compressed MF data may be organized, within volatile memory 102, into IMCUs. Each IMCU stores a different set of MF data. For example, as illustrated in FIG. 4, IMCU 402 stores half of column vectors 220 and 222, and IMCU 404 stores the other half of column vectors 220 and 222. Specifically, IMCU 402 includes a vector portion 420 that stores half the values from column c1, and a vector portion 422 that stores half the values from column c3. Similarly, IMCU 404 includes a vector portion 424 that stores the other half of the values from column c1, and a vector portion 426 that stores the other half the values from column c3.

In this example, the IMCUs divide the MF data based on the rows to which the data belongs, where IMCU 402 corresponds to rows r1 to r3 of table 200, and IMCU 404 corresponds to rows r4-r6 of table 200. However, this is only one of many different ways that the MF data may be spread among IMCUs. For example, different IMCUs may store MF data for different tables, different partitions of a table, different columns of a table, different segments, different extents, etc.

Metadata for the MF Data

To determine whether the MF data has the data required to process a query, and if so, to find the MF data required to process the query, the database server needs to know which PF data is mirrored in the MF data, and specifically which specific PF data is mirrored by each IMCU. Therefore, according to one embodiment, metadata 430 for the MF data is maintained in volatile memory 102, as illustrated in FIG. 4.

In one embodiment, metadata 430 includes a data-to-IMCU mapping. The data-to-IMCU mapping indicates which data is contained in each IMCU. This indication may be made in a variety of ways, including storing data that indicates, for each IMCU, one or more of the following:
- the table(s) whose data is stored in the IMCU
- the column(s) whose data is stored in the IMCU
- the range of rows stored in the IMCU
- the range of the disk blocks whose data is stored in the IMCU
- the segments whose data is stored in the IMCU
- the table partitions whose data is stored in the IMCU
- the extents whose data is stored in the IMCU
- the manner in which the data, within the IMCU, has been compressed
- the dictionary for decompressing the data stored in the IMCU (when a dictionary-type encoding has been used to compress the PF data)

In the situation illustrated in FIG. 4, the data-to-IMCU mapping may indicate, for example, that rows r1-r3 of columns c1 and c3 of table 200 are stored in IMCU 402, and that rows r4-r6 of columns c1 and c3 of table 200 are stored in IMCU 404.

Multi-Instance Environments

In some environments, the same PF data is accessed by multiple database server instances. Such environments are referred to herein as multi-instance environments. In a multi-instance environment, each database server instance may have access to volatile memory that the other database server instances cannot access directly. In such situations, one may populate the volatile memory of each of the database server instances with the same MF data, or may cause different portions of the MF data to be stored in the volatile memories of different database server instances. In the case where different portions of the MF data is stored in the volatile memories of different database server instances, metadata 430 may also include an IMCU-to-instance mapping.

Figure 5A:
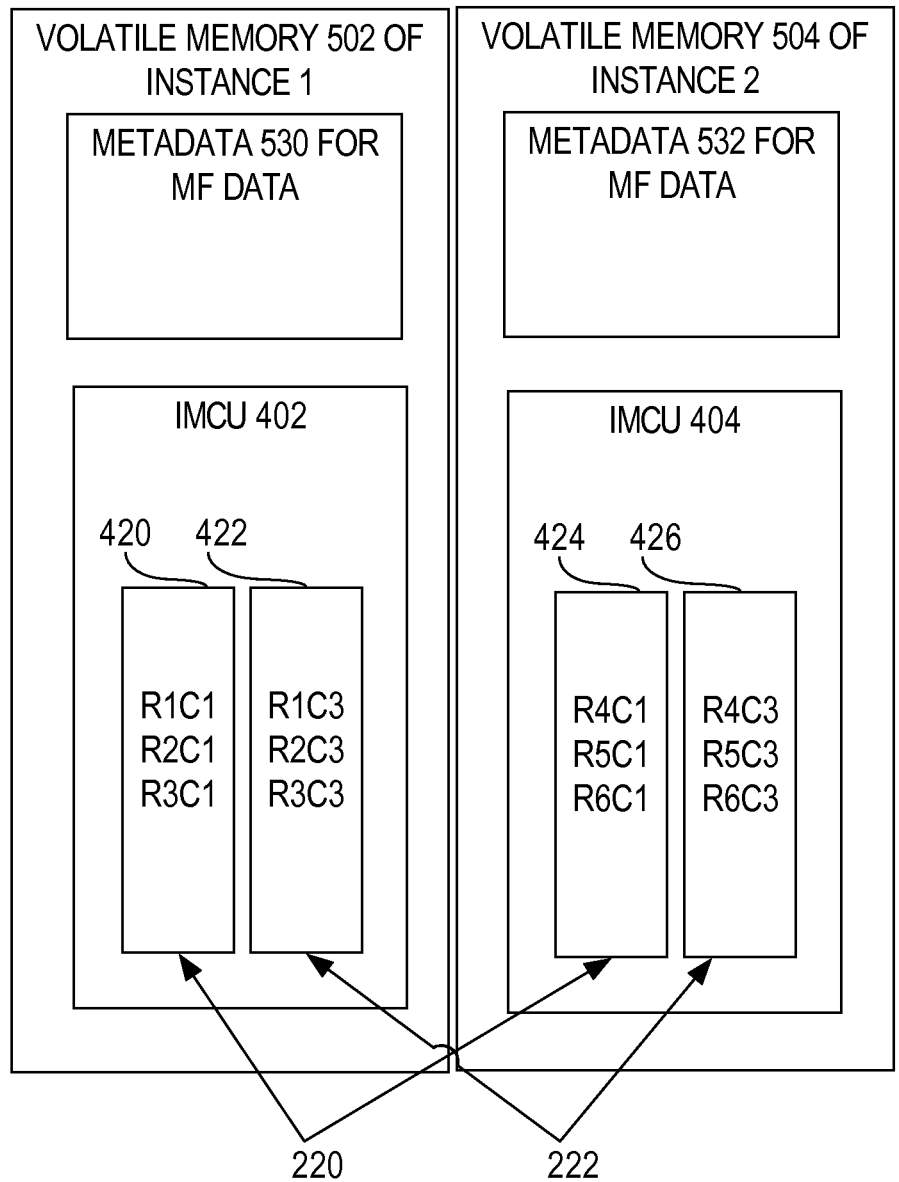
FIG. 5a is a block diagram illustrating how different database server instances may be assigned to manage different sets of MF data, where the sets are based on row ranges.

For example, referring to FIG. 5a, it illustrates an embodiment in which IMCU 402 is stored in the volatile memory 502 of one database server instance (instance 1), and IMCU 404 is stored in the volatile memory 504 of another database server instance (instance 2). For the database servers to know where specific portions of the MF data reside, each maintains metadata (530 and 532) to indicate both (a) where IMCUs 402 and 404 reside, and (b) what data they contain.

In FIG. 5a, MF data from the same two columns (c1 and c3) is distributed between two database instances. However, it is also possible to distribute the MF data among database servers on other basis. For example, different instances may have the MF data for different tables, different columns, different partitions, different segments, different extents, etc.

Figure 5B:
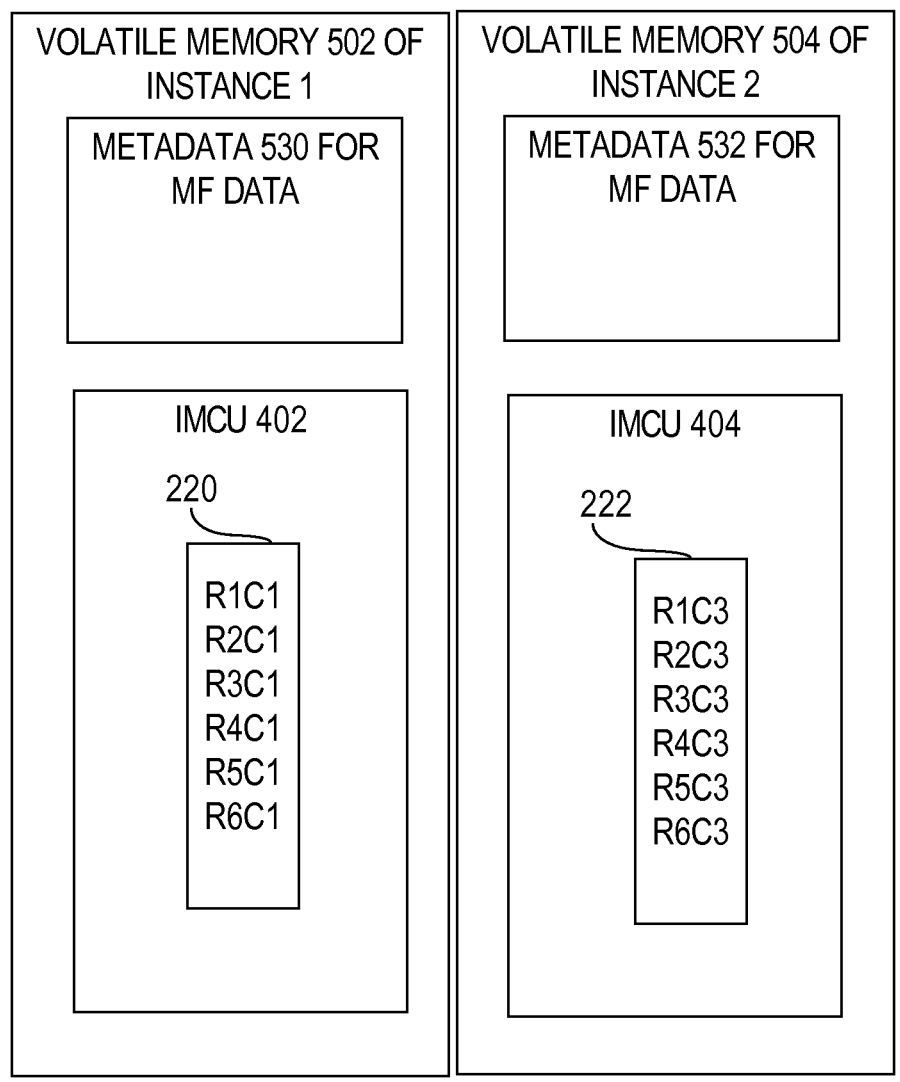
FIG. 5b is a block diagram illustrating how different database server instances may be assigned to manage different sets of MF data, where the sets are based on columns.

FIG. 5b is a block diagram of a scenario in which the MF data is distributed among the database instances based on column. Specifically, in FIG. 5b, the IMCU 402 stored in the volatile memory 502 of instance 1 includes the entire column vector 220 for column c1, while the IMCU 404 stored in the volatile memory 504 of instance 2 includes the entire column vector 222 for column c3.

Because it is more efficient to access local data than to obtain data from a remote instance, the location of the MF data may be a factor in determining whether to obtain a particular data item from the MF data or the PF data. For example, in the scenario illustrated in FIG. 5b, if a query that is being executed by the database server of instance 1 requires data from column c1, the database server may decide to obtain the data from column vector 220, rather than from the PF data. On the other hand, if the same query being executed by the same database server requires data from column c3, then the database server may decide to obtain the data from the PF data.

When a database server determines that it is more efficient to perform an operation using MF data that resides in a remote instance that to use the PF data, the database server requests the remote instance to perform the operation. For example, in the scenario illustrated in FIG. 5b, if the database server of instance 1 is executing a query with the predicate "where c3=X", the database server of instance 1 would request the database server of instance 2 to evaluate "where c3=X" using column vector 222. In response to evaluating the predicate, the database server of instance 2 would return to the database server of instance 1 data that indicates which rows satisfy the predicate.

Keeping the Mirror Format Data in Sync

The MF data 104 is only useful if the MF data 104 is kept reasonably up to date with all changes being made to the PF data. For example, if a query calls for the current values from column c1, then only the values within column vector 220 that are current can be used. Those values within column vector 220 that are invalid must be obtained from some other source. For example, if a query calls for current values of c2 from rows where c1="joe", then column vector 220 can only be used to identify the rows where c1="joe" for those rows that have values in the column vector 220 that are current.

Consequently, a mechanism is provided for keeping the mirror format data 104 in sync with the PF data as updates, inserts and deletes are performed on the PF data. Specifically, in one embodiment, the transaction manager of a relational database server, which is conventionally designed to transactionally update the PF data, is modified to concurrently transactionally update the MF data. For example, when the transaction manager updates a particular item in the PF data as part of a transaction, the transaction manager also updates the particular item in the MF data (if the particular item is in the MF data) as part of the same transaction.

By maintaining MF data 104 and the PF data transactionally synchronized, the result set of a query will be the same regardless of whether the query was processed using data items obtained exclusively from the MF data 104, or data items obtained exclusively from the PF data. The result set will also be the same if the query is processed using some data items from MF data 104, and other data items from the PF data.

In-Place Updates to MF Data

For the MF data to remain transactionally consistent with the PF data, changes are made permanent to the MF data at the same time the changes are made permanent to the PF data. For example, when a transaction that changed r1c1 from X to Y commits, r1c1 must be changed from X to Y in both the PF data and the MF data.

In some situations, it is possible to directly update the MF data to reflect a change made by a transaction when the transaction commits. For example, if column vector 220 is either uncompressed, or compressed in a manner that produces fixed-width values, it is possible to directly change the value of r1c1 from X to Y in the column vector 220 when the transaction commits, without otherwise affecting the column vector 220 or incurrent significant overhead.

However, in other situations, it may be necessary to update the MF data implicitly. When updated implicitly, the MF data itself does not necessarily change, but metadata is stored to indicate that the values contained therein have been updated. As shall be described in greater detail hereafter, the metadata used to record implicit updates to the MF data may include journals and changed-row bitmaps.

Journals

In some embodiments, keeping the MF data in sync with updates to the PF data is complicated by the fact that the MF data may be in a compressed format. For example, if column vector 220 is compressed, then directly updating a value within the column vector 220 may require the entire column vector to be decompressed, the update performed, and then the entire column vector to be compressed again. It would not be efficient to perform such operations in response to every update performed on the PF data.

To reduce the amount of decompression and decompression operations required to keep the MF data in sync, one embodiment makes use of journals to make implicit updates to the MF data. In general, journals store information about updates (a) made to the PF data, and (b) not yet made directly to the MF data.

Referring to FIG. 3, it illustrates an embodiment in which journals 304 are maintained in conjunction with column vectors 220 and 222. In the embodiment illustrated in FIG. 3, column vectors 220 and 222 store compressed MF data 302. Because the data within the column vectors 220 and 222 is compressed, a significant amount of overhead would be required to directly update the data within the column vectors 220 and 222.

While journals 304 are also in volatile memory 102, journals 304 generally contain uncompressed data 302 that indicates changes made to the PF data that is not yet reflected in column vectors 220 and 222. For example, if the value of R3C1 of table 200 is updated from X to Y, rather than change the value of R3C1 in column vector 220, an entry is stored in one of journals 304 to indicate that R3C1 has been changed, and to record the new value for R3C1.

Journals 310 include a global journal 310 and numerous private journals. In general, global journal 310 records only those changes that have been made by committed transactions. Before transactions commit, the changes made by the transactions are stored in the private journals, as explained in greater detail hereafter.

Journals 310 may include entries for rows that do not exist in the MF data. For example, assume that the MF data for table 200 is created at time T1, and at time T2 a new row is inserted into table 200. Under these circumstances, an entry for the new row will initially be added to private journal of the transaction that inserted the row, and the entry for the new row will be moved to the global journal for table 200 when that transaction commits.

According to one embodiment, all journals support full transactional semantics (e.g. queries, DMLs, rollback to savepoint, rollback/abort, parallel queries/DMLs, and distributed transactions). In addition, journals can interoperate with the on-disk database system. For example, when the data is purged from an in-memory journal, required changes can be obtained from the PF data on disk, if a query needs them.

Private Journals

As mentioned above, journals 304 are used to store data that indicates (a) changes made to the PF data that (b) are not yet reflected in the MF data stored in IMCUs. Such changes are typically made by database servers as part of transactions. According to one embodiment, in addition to having a single "global" journal, such as journal 310, for all such changes, a separate "private" journal is maintained for each transaction.

For example, FIG. 3 illustrates the situation in which three transactions TX1, TX2 and TX3 are making changes to PF data that is mirrored in the compressed MF data 302. In addition to making the changes to the PF data, the transactions make the same changes to the MF data by storing, in their respective private journals, data that indicates what the changes are.

Similar to the changes made to the PF data, those changes reflected in the private journal of a transaction are not considered permanent until the transaction commits. Consequently, the changes reflected in the private journal of any given transaction will not be visible to other transactions until the given transaction commits. In the example shown in FIG. 3, the contents of journal 312 will be ignored by transactions TX2 and TX3. The contents of journal 314 will be ignored by transactions TX1 and TX3. The contents of journal 316 will be ignored by transactions TX1 and TX2.

Moving Journal Entries Upon Commit

The global journal is visible system-wide, since all changes reflected therein have been committed. Thus, in response to transaction TX1 committing, the changes reflected in the private journal 312 of TX1 are moved to the global journal 130. Similarly, in response to transaction TX2 committing, the changes reflected in the private journal 314 of TX2 are moved to the global journal 130. Likewise, in response to transaction TX3 committing, the changes reflected in the private journal 316 of TX6 are moved to the global journal 130.

As mentioned above, when a transaction commits, the contents of that transaction's private journal are moved to the appropriate global journals. In embodiments where the global journals are maintained on a per-IMCU basis and the private journals are maintained on a per-transaction basis, moving the private journal entries of a committed transaction may involve moving some of the entries to the global journal of one IMCU, and some entries to the global journal of another IMCU.

For example, assume that a transaction modifies a first set of data that maps to a first IMCU, and modifies a second set of data that maps to a second IMCU. Prior to commit, entries for both sets of modifications are stored in the private journal of the transaction. However, when the transaction commits, the entries for modifications to the first set of data are moved to the global journal for the first IMCU, and entries for modifications to the second set of data are moved to the global journal for the second IMCU.

After a transaction's changes are persistently committed to the PF data, the transaction is assigned a commit time. In response to being assigned a commit time, the journal entries of the transaction are updated to reflect the commit time. Once a transaction's journal entries are moved to the appropriate global journals and updated with the commit time of the transaction, the changes reflected in those entries become visible to other transactions.

As mentioned above, data within an IMCU need not be arranged in rowid order. When not in rowid order, the column vector of rowids (e.g. vector 330) may be used to locate data within an IMCU based on rowid. Specifically, the position of a rowid within vector 330 is the position of the values for the corresponding row within the other vectors 220 and 222. According to one embodiment, even when the data within an IMCU is not arranged in rowid order, the entries in the corresponding private and global journals are organized based on rowid. Thus, when data in an IMCU is invalidated due to an update made to the corresponding PF data, the rowid of the invalidated data is recorded, rather than the position of that data within the IMCU.

Journal Entry Contents

In general, each journal entry contains all information required to determine (a) what data items are in the entry, and (b) what version of those data items does the entry reflect. In one embodiment, each journal entry includes:
the rowid of the row associated with the entry
a timestamp that indicates when the data contained in the row was "current"
values for one or more columns of the corresponding row
With respect to the column values, in one embodiment, each journal entry includes full row images that result from all Data Manipulation Language (DML) operations. In such an embodiment, the journals are initially row-major data stores. However, under certain circumstances (such as when the journals grow too large), the contents of the journal may be converted to a column-major row store. The column-major information in the journals would only need to include values for those columns that are mirrored in the MF data.

In on embodiment, a threshold is established for how many rows a journal may have in row-major format. Once that threshold is exceeded, a conversion operation is triggered for converting some or all of the journal's row-major data to a column-major format. The threshold may be, for example, that a journal may have no more than 1000 rows of row-major data.

Journal Indexes

According to one embodiment, an index, maintained in volatile memory 102, is built on the rowid column of each private journal. In addition to the rowid column, indexes may be built on any other column of the private journals that will improve overall query processing efficiency. These journal indexes may be used, for example, during query processing to perform look-ups, or range-based scans of the journals.

Journal Structure

According to an embodiment, journals are organized, within volatile memory 102, as a series of temporally-ordered extents. For example, assume that the version time for MF data 104 is T1, and that the current system time is time T10. Under these circumstances, journal 310 may be organized into three extents, the first of which includes journal entries for changes made between time T1 and time T3, the second of which includes journal entries for changes made between time T3 and time T6, and the third of which includes journal entries for changes made between time T6 and the current system time.

When structured in this manner, extent pruning may be used to reduce the number of extents that are processed during a table scan. For example, for a table scan performed for a transaction with a snapshot time of T2, only the first extent of journal 310 would need to be scanned. The other journals contain only changes that the transaction is not allowed to see.

On the other hand, for a table scan performed for a transaction with a snapshot time of T7, all three extents of journal 310 would have to be scanned, because all three could contain journal entries for changes that must be seen by the transaction.

Merging Global Journals into the MF Data

As mentioned above, journals are used because it is inefficient to update the MF data directly every time a database operation makes a change to the corresponding PF data. This is particularly true when the MF data is compressed. However, it is also inefficient to allow the journals to grow indefinitely, both because eventually the journals will require too much volatile memory, and because the larger the journals grow, the less efficient it becomes to use the MF data to satisfy queries.

Consequently, according to one embodiment, the content of the global journals is periodically merged into the MF data. When the MF data is compressed, this merger operation typically involves decompressing the MF data, updating the MF data to reflect the most current committed versions of the items contained therein, and then compressing the MF data.

After data has been merged into the MF data contained in a particular IMCU, the metadata associated with the IMCU is updated to indicate a new version timestamp for the IMCU. For example, if the MF data in an IMCU reflected all changes made as of time T1, then prior to the merger the version timestamp for the IMCU would be T1. If the update involves merging into the MF data of the IMCU all changes that were made up to time T3, then after the merger the version timestamp for the IMCU would be updated to T3.

Post-Merger Retention of Global Journal Entries

As shall be described in greater detail hereafter, in some embodiments, changed-row bitmaps may be used to indicate which data items in the MF data have become stale. A data item in the MF data becomes stale when a change (not reflected in the MF data) is committed to the data item. Once the contents of a global journal have been merged into the corresponding MF data, the old entries in the journals may be purged and the changed-row bitmap is updated to reset all bits (thereby indicating that no data items in the newly-merged MF data are stale). However, in some embodiments, rather than purge all old journal entries in response to merging changes into the MF data, some of the old data may be retained in order to continue to use the MF data for transactions whose snapshot-times are before the merger time.

For example, if the post-merger version timestamp for the IMCU is T3, then a transaction with a snapshot time of T2 cannot use the MF data in the IMCU, because that data contains changes that the transaction is not allowed to see. However, if all the journal entries as of time T1 have been retained, it is possible to use those journal entries, in conjunction with the IMCU, to obtain some data items as of time T2. Specifically, for a data item whose journal entries have been retained, a transaction with a snapshot time of T2 would use the version of the data item from the most recent journal entry that precedes T2, the snapshot time of the transaction.

For example, assume that the journal only has a single entry, and the entry indicates that r5c1 was changed at time T3 from X to Y. Consequently, the post-merger IMCU will have value Y for r5c1. However, to provide the correct value to the transaction, the database server inspects the journal to see that the row of r5c1 was changed between the snapshot time T2 and the version time T3 of the IMCU. Based on this information, the database server knows that the value Y for r5c1 is too recent for the transaction to see, and that the transaction must instead see value X for r5c1. Consequently, in the data obtained for the transaction, the database server changes the value of r5c1 Y to X.

Unfortunately, it is not feasible to retain old journal entries indefinitely. Therefore, according to one embodiment, a configuration parameter is provided for specifying the retention policies associated with IMCUs or the database objects to which they correspond. For example, a retention policy may be that, for table 200, journal entries are retained for at least one hour. Thus, for IMCUs that contain data for table 200, when purging journal entries after a merger, only those journal entries that are associated with snapshot times that are less than an hour old are retained. Retaining already-merged journal entries in this manner ensures that transactions that have snapshot times less than an hour old will always be able to obtain the correct version of data items from the MF data.

According to one embodiment, old journal entries are retained until the database server determines that no currently executing queries will need the old journal entries. For example, if changes are merged into an IMCU at time T10, then journal entries, in the global journal of that IMCU, that are associated with changes made before time T10 may automatically be purged by the database server when there are no more currently-running transactions that have snapshot times before T10.

In some embodiments, the journal entries may store only an indication of which row was changed, and when, without storing the actual values involved. In such an embodiment, the pre-merger journal entries are still useful for indicating which values from the post-merger IMCU cannot be used by a transaction. In the example given above, the version of r5c1 that is in the post-merger IMCU cannot be used for a transaction with a snapshot time of T2, because the journal would indicate that r5c1 was changed between the snapshot time T2 and the version time T3 of the post-merger IMCU. Under these circumstances, if the journal does not have the actual pre-update value of r5c1 (i.e. X), the database server may obtain that value from the PF data, and the rest of the values that it needs from the MF data.

Global Journals and Memory Constraints

As explained above, both global and private journals are maintained in volatile memory. Private journals are used to record changes made by transactions that have not yet committed. Global journals, on the other hand, generally record changes made by transactions that have committed.

The more entries that a global journal has, the more volatile memory is consumed. Under some circumstances, there may simply not be enough volatile memory to store excessively large global journals. One way of handling these situations is to purge older extents of the journals.

For example, assume that the global journal of an IMCU has three extents E1, E2 and E3. Assume further that E1 contains entries for transactions that committed between time T1 and time T5, E2 contains entries for transactions that committed between time T5 and time T9, and E3 has journal entries for transactions that committed between time T9 and the current system time.

Assume further that the version time of the IMCU is T5. Under these circumstances, the entries in E1 may be used to "roll back" the values in the IMCU for transactions that have snapshot times between T1 and T5. On the other hand, the entries in E2 and E3 may be used to "roll forward" the values in the IMCU for transactions that have snapshot times after T5.

When faced with memory constraints, the database server may purge extents E1 only, E1 and E3, or E1, E2 and E3, depending on how much memory is needed. Purging an extent has an effect on performance of certain transactions. For example, assume that E1 is purged. After E1 is purged, a transaction with a snapshot time of T3 may require data items that maps to the IMCU. The transaction may obtain data items that did not change between T3 and T5 from the IMCU. Data items that did change between T3 and T5 are obtained from the PF data, because those items were recorded in E1 which has been purged.

Even after the purging of its journals, an IMCU may be used to supply data that did not change between (a) the version time of the IMCU and (b) the snapshot time of the transaction requesting the data. For example, if the IMCU version time is T1, a transaction with a snapshot time of T5 may obtain data items from the IMCU that were not changed between T1 and T5. As shall be described in greater detail hereafter, those changed data items may be identified using a delete vector generated for the transaction.

Snapshot Metadata Units

Figure 6:
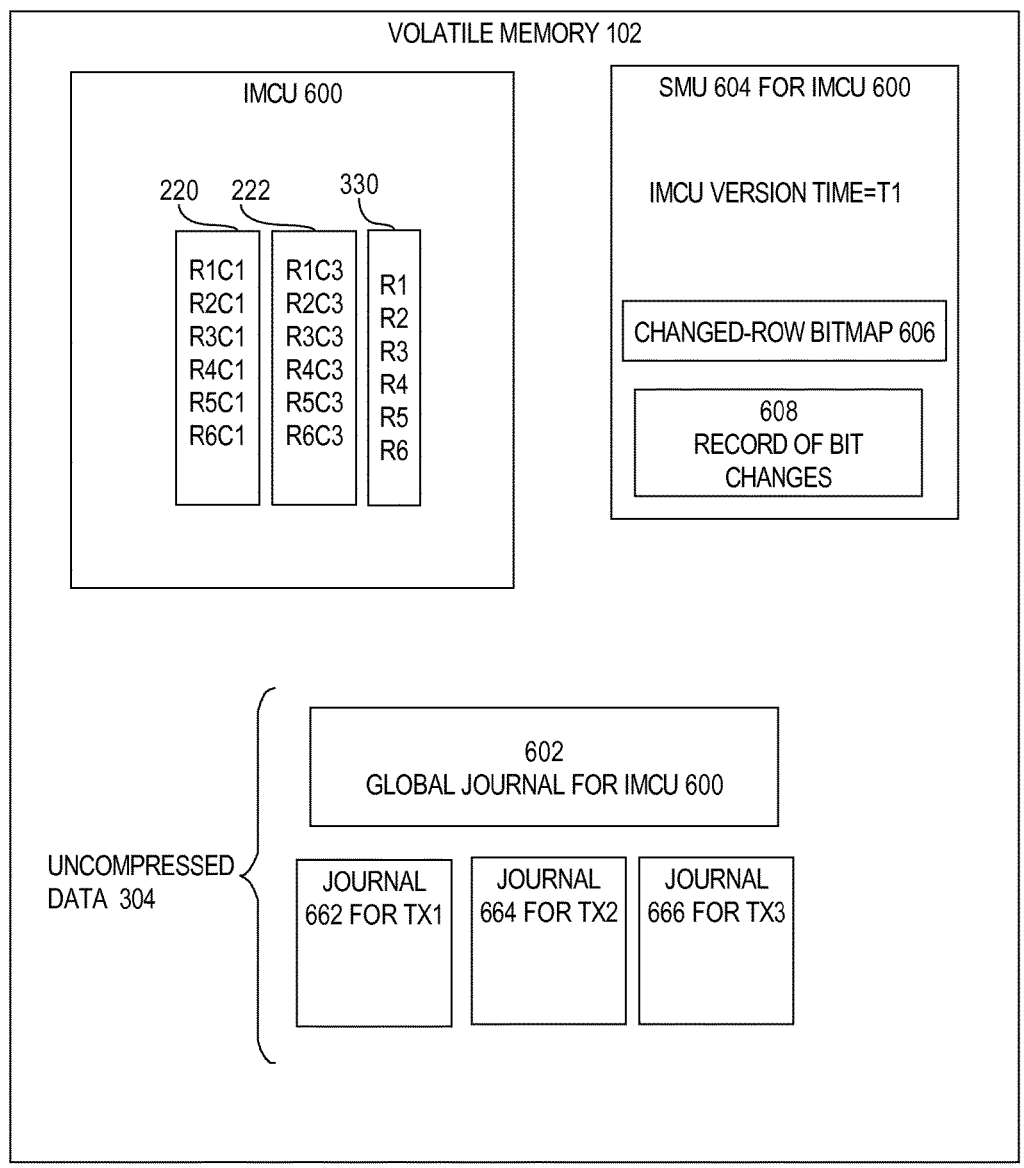
FIG. 6 is a block diagram illustrating an SMU that stores a changed-row bitmap and a record of bit changes, according to an embodiment.

As mentioned above, metadata is maintained for each IMCU. In one embodiment, a Snapshot Metadata Unit (SMU) is responsible for maintaining at least some of that metadata. Referring to FIG. 6, an IMCU 600 is illustrated with its corresponding SMU 604. In the illustrated embodiment, SMU 604 stores the IMCU version time and a changed-row bitmap 606. The IMCU version time is the time at which the values in the IMCU 600 were current. Changed-row bitmaps shall be described in greater detail hereafter.

Among other things, the SMU for an IMCU captures all updates that affect the MF data contained in the IMCU. Consequently, the SMU for an IMCU may indicate, for example, whether the corresponding IMCU has valid values for a given rowid/snapshot-time combination. As another example, the SMU may generate a list of rowids of all rows for which the corresponding IMCU has invalid values, relative to a given snapshot-time. This list may then be used in conjunction with the rowid column vector to identify the rows for which values must be obtained from other sources (e.g. from journals or from the PF data).

Changed-Row Bitmaps

In one embodiment, the updates captured by an SMU are indicated by a "changed-row bitmap" maintained within the SMU. Referring again to FIG. 6, the changed row bitmap 606 for IMCU 600 is maintained in SMU 604. A changed-row bitmap is a bitmap that indicates the rows (a) for which the corresponding IMCU has values, and (b) that have been changed by transactions that committed since the version timestamp of the IMCU.

For example, when a transaction performs an update to rows r1, r3 and r5 of table 200, the SMU 604 for IMCU 600 updates the changed-row bitmap of IMCU 600 by setting the bits that correspond to rows r1, r3, and r5 because those are the updated rows that fall within the MF data of IMCU 600.

According to one embodiment, when a change is made to data that is mirrored in IMCU 600, the SMU 604 stores a record of which bits of the changed-row bitmap 606 were set, and when. These records are collectively represented in FIG. 6 as record of bit changes 608. For example, if an update made at time T1 modifies row r1, then the bit for row r1 would be set, and a record is stored to indicate that the bit for r1 was set at time T1.

According to one embodiment, the changed-row bitmap is created on an as-needed basis. For example, if the changed-row bitmap is to reflect whether a change has occurred to a million rows, a one million bit data structure is not pro-actively initialized. Instead, data is only stored for row ranges that have at least one bit set. For any range for which no data is stored, all bits are deemed to be "0".

Figure 8:
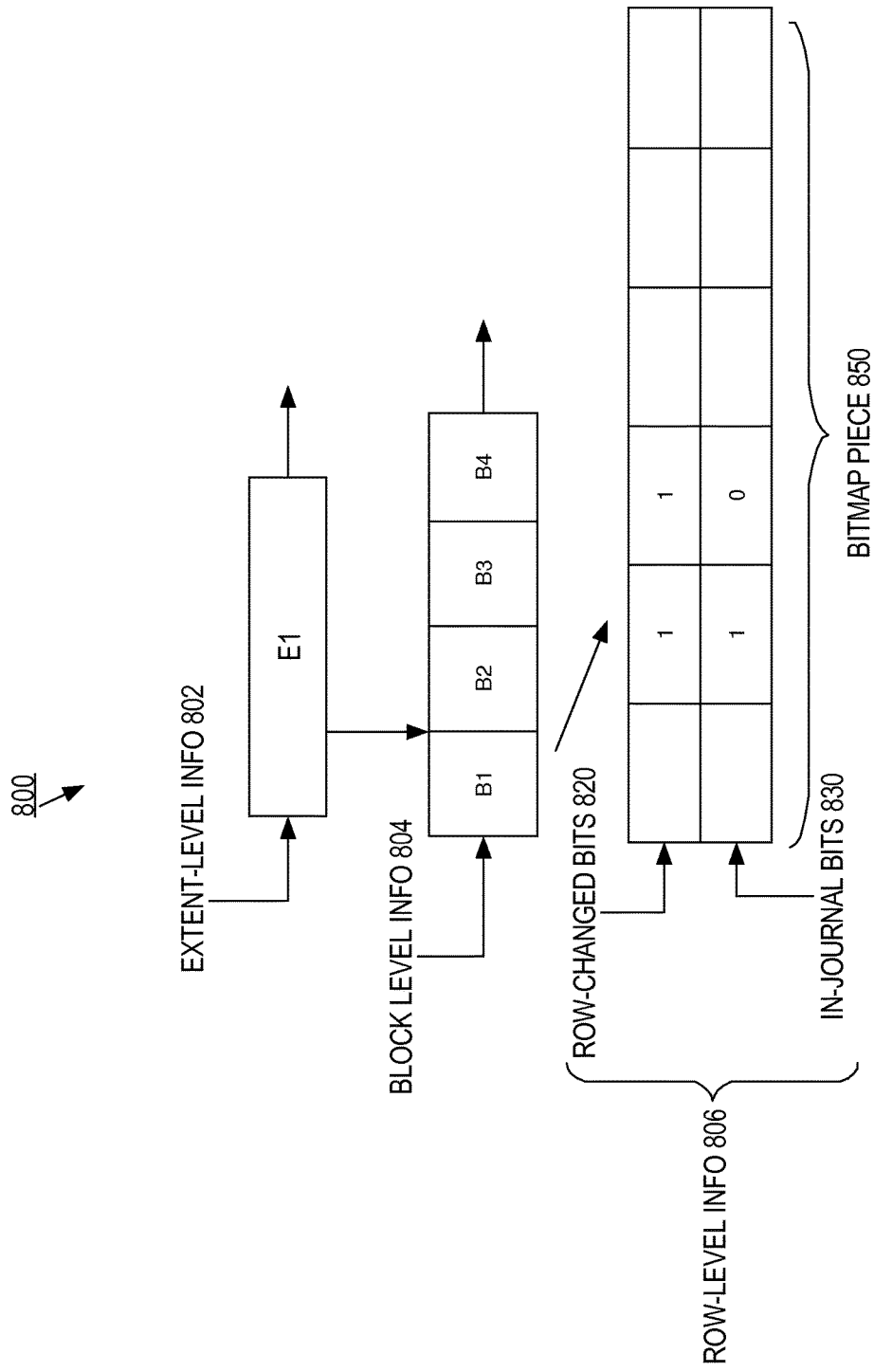
FIG. 8 is a block diagram illustrating a structure for implementing a changed-row bitmap, according to an embodiment.

Referring to FIG. 8, it illustrates a hierarchical structure 800 for representing a changed-row bitmap, according to one embodiment. In the illustrated embodiment, the hierarchical structure 800 has levels that correspond to extents, blocks, and rows. The extent-level information 802 includes a record for each extent in which there is any set bit. Extent-level records link to other extent-level records (not shown), thereby forming a linked list of records for the extents that have one or more set bits.

In addition, the extent records include a pointer to a linked list of block level information 804 for the blocks that reside in the extent. In the illustrated example, the record for extent E1 points to the record for blocks B1, B2, B3 and B4. The block-level record can be the first record in a linked list of block-level records for the blocks that belong to extent E1.

The block-level records, in turn, point to row-level information 806 stored in the form of bitmap pieces. Specifically, in the illustrated embodiment, the record for block B1 points to bitmap piece 850.

Each position in the bitmap piece 850 corresponds to a row whose data items are stored in block B1. In the illustrated embodiment, bitmap piece 850 has six bit positions, which correspond to six rows are stored in B1. For each bit position, bitmap piece 850 includes two bits, one of which is a row-changed bit 820 and the other of which is an in journal bit 830. For any given row, the row-changed bit indicates that the row changed since data items for the row were stored in the IMCU. The in journal bit for a row indicates whether the updated values for the row are stored in the IMCU's journal.

Based on the information in data structure 800, the database server may determine whether the current version of a data item resides in the IMCU, in the journals of the IMCU, or in neither. Specifically, if the structure 800 has no information for a given row, then the IMCU has the current version of the data items from the row. The IMCU also has the current version of the data items from the row if the structure 800 has information for the row, and the row-changed bit for the row is "0". If structure 800 has information for the row, the row-changed bit is set and the in journal bit is set, then the IMCU does not have the current version of the item, but the journal for the IMCU does have the current version of the item. Finally, if structure 800 has information for the row, the row-changed bit is set, and the in journal bit is not set, then neither the IMCU nor the journals have the current version of the data item, and the current version must be retrieved from the PF data.

The records of structure 800 are created on an as-needed basis. Thus, if the IMCU is current for all data items in a particular extent, then structure 800 may not have any records for the extent. Similarly, if the IMCU is current for all data items in a particular block, then structure 800 may not have any block level information 804 for that block. By only storing changed-row information for extents/blocks that have been changed or added since the version time of the IMCU, structure 800 may be significantly smaller than it would otherwise be if bits were pre-allocated for every row.

Using the Record of Bit Changes

For a transaction that requires the most recent version of data items, a set bit in the changed-row bitmap 606 indicates that the MF data has stale data for that row, and therefore the IMCU 600 cannot be used to supply data from that row. However, not all transactions require the most recent version of data items.

For example, in many database systems, transactions are assigned a snapshot time, and return data that reflects the state of the database as of that snapshot time. Specifically, if a transaction is assigned a snapshot time of T3, then the transaction must be provided versions of data items that include all changes that were committed before T3, and no changes that were not committed as of T3 (except for changes that the transaction makes itself). For such transactions, a set bit in the changed-row bitmap 606 does not necessarily indicate that the IMCU 600 cannot be used to be the source for items for the corresponding row. Specifically, such transactions may still use the IMCU 600 to obtain data for a particular row, even though the bit for that row is set in changed-row bitmap 606, if the bit was first set after the snapshot time of the transaction.

For example, assume that the column vectors 220 and 222 contain data as it existed at time T1, as indicated by the IMCU version time stored in SMU 604. At a later time T5, an update operation changes row r1. Specifically, the update changes the value of r1c1 for X to Y. In response to this update, the changed-row bitmap 606 of IMCU 600 would change from 000000 to 100000, setting the bit that corresponds to row r1 to "1". In addition, a record is stored within SMU 604 indicating the bit for r1 was changed at T5.

At yet a later time T9, another update operation changes row r3. Specifically, the second update changes the value of r2c3 from A to B. In response to this update, the changed-row bitmap 606 of IMCU 600 would change from 100000 to 101000, setting the bit that corresponds to row r3 to "1". In addition, a record is stored within SMU 604 indicating that the bit for row r3 was set at time T9.

After these updates have occurred, the database server may execute a transaction that reads the values of columns c1 and c3. If the snapshot time of the transaction is earlier than T5, then the transaction may read all the values from column vector 220 and 222. The database may determine this by comparing the snapshot time of the transaction to the times indicated in the record of bit changes 608. If the snapshot time of the transaction is after the IMCU version time, but before any times in the record of bit changes 608, than all values in the IMCU 600 are valid relative to that transaction.

If the snapshot time of the transaction is after T5 but before T9, then the transaction may read all values from column vectors 220 and 222 except the values from row r1, which must be obtained elsewhere (e.g. from a journal or from the PF data). If the snapshot time of the transaction is after T9, then the transaction may read all values from column vectors 220 and 222 except the values from rows r1 and r3, which must be obtained elsewhere.

Delete Vectors

In one embodiment, to account for the snapshot time of transactions that read values that are mirrored in IMCU 600, the changed-row bitmap 606 is used in conjunction of the record of bit changes 608 to create a delete vector for each transaction that seeks to read data from IMCU 600. A delete vector is snapshot-time specific, because bits in the delete vector are only set for rows that were updated before the snapshot-time associated with the transaction for which the delete vector is constructed. Stated another way, each delete vector reflects the version of the changed-row bitmap that was current as of the snapshot-time. Thus, the older the snapshot-time associated with a delete vector, the older the version of the changed-row bitmap the delete vector reflects, and thus fewer the number of bits that will be set in the delete vector.

For a transaction with a snapshot time after the version time of the IMCU, a delete vector is made for the transaction by "rolling back" changes that occurred to the changed-row bitmap 606 after the snapshot-time of the transaction. For example, if a transaction has a snapshot time of T5, the database server searches the record of bit changes 608 to identify changes that occurred after time T5. A copy of the changed-row bitmap 606 is made, and within that copy the bits that correspond to the changes that occurred after time T5 are reset to "0". For transactions with snapshot times before the version time of the IMCU, the delete vector may be generated by making a copy of the changed-row bitmap 606, and within that copy setting to "1" the bits of rows that were changed between the snapshot time of the query and the version time of the IMCU.

Because delete vectors are transaction-specific, at any given time, five distinct transactions may be performing scans of the rows that map to a particular IMCU. Each of the five transactions may have been assigned a different snapshot-time. Consequently, each of the five transactions will have a different delete vector, though all five delete vectors are generated based on the same changed-row bitmap of the SMU that corresponds to the IMCU.

Post-Merge Retention of Pre-Merge Changed-Row Bitmaps

As mentioned above, when changes are merged into an IMCU, all values in the changed-row bitmap of the IMCU are reset to "0" to indicate that no rows have been changed since the new version time of the IMCU (which will be the time at which the IMCU is refreshed/merged). However, rather than simply discard or overwrite the existing changed-row bitmap, a copy of pre-merge changed-row bitmap may be saved. A saved copy of a pre-merge changed-row bitmap is referred to herein as a "retained bitmap". As shall be described in greater detail hereafter, such retained bitmaps allow a post-merge IMCU to be used to provide data items to transactions that have snapshot times before the merge.

For example, assume that an IMCU is constructed at time T1. From time T1 to time T10, the changes made to the data items in the IMCU are recorded in its global journal, rather than being made directly to the data items themselves within the IMCU. While those changes are being recorded within the journal, the changes are also causing corresponding bits to be set in the changed-row bitmap of the IMCU. At time T10, the changes are merged into the IMCU, causing the version time of the IMCU to change from T1 to T10.

Under these circumstances, the state of the changed-row bitmap immediately before the merger reflects which rows, within the IMCU had changed between time T1 and time T10. By indicating which rows had changed between time T1 and time T10, the changed-row bitmap likewise indicates which rows had not changed between time T1 and time T10. Within the post-merger IMCU, those rows that had not changed between time T1 and time T10 can be provided to transactions that have snapshot times between T1 and T10.

Specifically, a copy of the pre-merge version of the changed-row bitmap is retained after the merger. Along with the retained bitmap, the version timestamp of the pre-merge IMCU is also stored. In the example given above, the retained bitmap would be associated with the version timestamp of T1.

When a transaction (a) requires data items that map to an IMCU, and (b) has a snapshot time that falls between the retrained bitmap time and the current IMCU time, the retained bitmap is used to identify the rows that were not changed between the retained bitmap time and the current IMCU time. Values for the identified rows may be provided to the transaction from the current IMCU. Values for the remaining rows are obtained elsewhere. Specifically, values for the remaining rows may be obtained from the global journal of the IMCU if the relevant journal entries have not yet been purged, or from the PF data.

IMCU Refresh Undo

Rather than store a single retained bitmap in response to the most recent merge, a separate retained bitmap may be stored in response to each merge. The retained bitmaps for a given IMCU may be linked in chronological order. The linked set of retained bitmaps for an IMCU constitutes an "IMCU refresh undo" for the IMCU.

For example, assume that an IMCU was created at time T1, and then refreshed/merged at times T10, T15 and T30. Under these circumstances, the IMCU refresh undo for the IMCU would contain three retrained bitmaps RB1, RB2 and RB3. These three retrained bitmaps would be associated with times T1, T10 and T15, respectively.

In the present example, the "0" bits of RB1 indicate the rows that were not changed between times T1 and T10. The "0" bits of RB2 indicate the rows that were not changed between the times T10 and T15. The "0" bits of RB3 indicate the rows that were not changed between the times T15 and T30.

Given any snapshot time, the IMCU refresh undo may be used to identify which rows, within the current IMCU can be provided to a transaction with that snapshot time. For example, for a transaction with the snapshot time T18, the "0" bits in RB3 would indicate which rows can be provided to the transaction from the current IMCU. As another example, for a transaction with the snapshot time of T12, RB2 and RB3 can be combined using a logical OR operation to produce a bitmap that indicates which rows can be provided to the transaction from the current IMCU. As yet another example, for a transaction with the snapshot time of T5, RB1, RB2 and RB3 can be combined using a logical OR operation to produce a bitmap that indicates which rows can be provided to the transaction from the current IMCU.

Thus, given a transaction with the snapshot time of TX, the retained bitmap with the highest timestamp that is below TX is combined, using a logical OR operation, with all more recent retained bitmaps of the same IMCU. The logical "OR" operation produces a bitmap where the "0"s correspond to rows that have not changed since TX and the version time of the current IMCU. Consequently, data items for those rows may be provided by the IMCU.

Transaction Downgrade Based on Memory Constraints

As mentioned above, changes made to items in an IMCU are recorded in journals rather than made directly to the items in the IMCU. The journals are maintained in volatile memory. Unfortunately, long-running transactions that make changes to large numbers of items may cause so many journal entries to be generated that there is insufficient room to store the entries in volatile memory.

Under these circumstances, the journal entries may be flushed to persistent storage to free up space in volatile memory. However, flushing the journal entries to persistent storage, and reading the entries from persistent storage thereafter, incurs a significant performance penalty. Therefore, according to one embodiment, transactions that are generating journal entries in sufficient quantity to cause memory issues are "downgraded".

According to one embodiment, such transactions are downgraded by pushing their existing private journal entries to the global journal of the IMCU, and ceasing to generate further private journal entries. Although in the global journal of the IMCU, such journal entries are not visible to other transactions because the journal entries are for an uncommitted transaction, and therefore initially associated with an "indeterminate" timestamp. When the downgraded transaction commits, the timestamps of the transaction's entries in the global journal are changed from indeterminate to the commit time of the transaction.

Rather than cease the generation of journal entries when in downgraded mode, transactions may continue to generate journal entries until the size of their private journal once again reaches the specified threshold. At that point, the private journal entries may once again be moved to the global journal, where the entries will not be visible to other transaction due to their indeterminate timestamp. This process of filling the private journal to a threshold, and then moving the entries to the global journal, may be repeated any number of times until the transaction either commits or is rolled back.

Regardless of whether a transaction that is operating in the downgraded mode continues to generate further private journal entries to record its changes, the changes are still recorded in the record of bit changes associated with the IMCU. Once the transaction commits, those bit changes are made to the changed-row bitmap.

By using the changed-row bitmap to record the fact that a change occurred, future transactions will avoid reading stale data items from the IMCU. When the changed-row bitmap indicates that data items associated with a particular row are invalid, transactions that require data items from that row must obtain the data items for a source other than the IMCU. In the case that the changes were made by a downgraded transaction that ceased generating journal entries, the changes will not appear in the global journal, so the data items are retrieved from the PF data.

In one embodiment, not all transactions that are using an IMCU are downgraded at once. Rather, the downgrades are performed on a per-transaction basis, where transactions are only downgraded if they satisfy certain criteria. The criteria may be, for example, that the amount of journal entries that they have generated exceeds a particular threshold.

In general, transactions must see the uncommitted changes that they have made themselves. Consequently, a downgraded transaction that has ceased generating journal entries may have to obtain the values of some data items that the transaction previously changed from the PF data, since no journal entry exists for those changes.

Maintaining Sync without Journals

In the sections above, it is explained that the MF data may be kept in sync with the PF data by recording changes in journals, while leaving the compressed MF data intact until the journals are merged into the compressed MF data. However, in an alternative embodiment, for one or more of the IMCUs, the MF data may be maintained in sync merely by invalidating the data in response to changes made to the corresponding PF data without using journals to record the changes.

In such an embodiment, delete vectors may be generated for a transaction, as described above. For those bits that are not set, the data may be obtained from the appropriate IMCU. For those bits that are set, the data must be retrieved from the PF data, since obtaining data from in-memory journals is not an option when no such journals are maintained.

The benefit of invalidating the MF data without recording the changes in journals is that the processing overhead and memory consumption of maintaining the journals is avoided. However, when data items in the IMCU are too stale to be used to process a transaction, accessing the appropriate version of the data items from the PF data will generally incur more overhead than would be required to obtain the data items from journals. In addition, refreshing the IMCUs in the absence of in-memory journals will also typically incur more overhead, because the changes that need to be merged into the IMCUs must be obtained from the PF data rather than from in-memory journals.

In some embodiments, journals may be maintained for some IMCUs, but not others. In addition, it is possible for the journal of an IMCU to be dropped, and yet continue to use the IMCU for data that has not been invalidated due to changes between the IMCU version time and the snapshot time of the transactions that require the data.

Determining from where to Obtain Data

Because MF data 104 is merely a mirror of some of the PF data (albeit in a different format), all data items contained in MF data 104 are also in the PF data. Therefore, for any query that requires access to data items that are mirrored in the MF data, the database server has the choice of obtaining that data from MF data 104, from the PF data, or partially from the MF data 104 and partially from the PF data.

In general, when the requested data is a row of a table, the location from which to most efficiently retrieve the data is cache 106 (assuming that the persistent format is row-major). If the requested row does not currently reside in cache 106, but the MF data 104 has all columns of the row, then MF data 104 is the location from which to most efficiently retrieve the row. Assuming that MF data 104 is column-major, MF data 104 is less efficient than cache 106 for retrieving a row because, in column-major format, the values for the row must be pieced together from various places within the MF data 104.

If not all of the data for the requested row is in the MF data 104, then at least some of the row must be retrieved from persistent storage 110. Typically, persistent storage 110 is the least efficient location from which to retrieve data, because disk accesses are significantly slower than operations on data stored in volatile memory. Thus, even though all data from column c1 is in column vector 220, the database server may decide to execute a scan by obtaining some of the values of column c1 from column vector 220, and by obtaining the rest of the values of column c1 from the PF data on persistent storage 110.

According to one embodiment, database objects, such as tables, can be "in-memory enabled". A table that has been in-memory enabled has at least a portion of its data mirrored in the MF data. For example, table 200 is in-memory enabled because data from two of its columns (c1 and c3) are mirrored in mirror format data 104. Specifically, data from column c1 of table 200 is mirrored in column vector 220, and data from column c3 of table 200 is mirrored in column vector 222.

When a table is not mirror-enabled, a scan of the table is performed by reading PF data from cache 106 and/or from persistent storage 110. On the other hand, when a table is mirror-enabled, it may be also possible to get some or all of the table's data from MF data 104. More specifically, it may be possible to obtain data of a mirror-enabled table from any of the following locations:

the persistently-stored PF data
the locally cached PF data
the PF data in the cache of another instance
the locally stored MF data
the MF data stored in the volatile memory of another instance
the locally stored MF data updated with information from journals
entirely from the journals
MF data stored in the volatile memory of another instance updated with information from journals
any combination of the above.

Further, the data can be obtained without the use of any indexes, with the use of conventional indexes on the PF data, and/or with the use of in-memory indexes. Further, indexes need not be used in conjunction only with the format based upon which the indexes were built. Thus, conventional indexes built on the PF data may be used to identify rows that must be retrieved, and then data for those rows may be retrieved from the MF data. Similarly, an in-memory index may be used to identify rows that must be retrieved, and some or all of those rows may be retrieved from the PF data.

According to one embodiment, a cost-based optimizer is used to determine, for any given database operation, which of the sources (or which combination of these sources) will be used to supply the data needed by the database operation. Additional factors used by the cost-based optimizer include whether conventional and/or in-memory indexes exist for quickly locating the desired data.

When to Create the MF Data

Before MF data may be used to satisfy a query, or to improve performance of a query whose results are ultimately obtained from the PF data, the MF data must be present in volatile memory. Unlike cache 106, mirror format data is not simply a copy of the data that is stored on persistent storage 110. Rather, because the mirror format is not based on the persistent format, volatile memory 102 is initially populated by (a) reading the PF data from persistent storage 110 and (b) converting the PF data thus obtained to the MF format.

The amount of overhead that is required to perform the PF-to-MF conversion will vary from situation to situation, based on how different the mirror format is from the persistent format. For example, if the persistent format is row-major disk blocks that have been compressed one way, and the mirror format is column vectors that are compressed another way, the amount of overhead required to perform the conversion may be extensive.

The decision about when to create the MF data may be based on a variety of factors. For example, if sufficient time is available at system start-up, all of the PF data that has been selected for mirroring may be pre-loaded into volatile memory 102 on start up. As mentioned above, loading the MF data involves reading the corresponding PF data from persistent storage 110 and then converting that PF data into the mirror format.

Repopulation of in-Memory Compression Units

A "repopulation operation" refers to the replacement of a stale IMCU that contains invalid data with a new IMCU that has the most recent values of the data. IMCUs may be re-created, for example, from the combination of (a) an older version of the IMCU, (b) data items read from blocks residing in the buffer cache, and (c) blocks retrieved from disk. A "repopulation operation" is also referred to herein as a "refresh" or "merge" operation.

An IMCU is considered not fully up to date when it contains rows that have been invalidated due to Data Manipulation Language ("DML") activity that occurs after the time of IMCU creation. The more stale is the IMCU (the more rows that have been marked invalid), the longer a query will take to process, as the invalid rows need to be obtained from somewhere (a journal or a buffer cache or disk) other than the IMCU and stitched into the returned row set. This additional fetching of rows from outside the IMCU adds to query processing; the greater the number of invalid rows, the longer the time taken.

On the other hand, populating too many IMCUs, or re-populating IMCUs too frequently, is also inefficient. Typically, population and repopulation are heavyweight time consuming tasks (CPU and IO) that are performed by background worker processes so as not to interfere with foreground operations (e.g. query processing).

Therefore, it is critical to strategically prioritize repopulation of IMCUs. Techniques are described hereafter for prioritizing IMCU repopulation in order to achieve optimal query response times.

Invalidity Counters

To prioritize IMCU repopulation operations, invalidity counters are maintained for each IMCU. An invalidity counter is a counter that indicates how stale an IMCU has become. According to one embodiment, for any given IMCU, invalidity counters are maintained at multiple levels of granularity. Specifically, according to one embodiment, for a given IMCU, a "row invalidity counter" of the IMCU reflects how many rows within the IMCU are currently invalid, and a "block invalidity counter" of the IMCU reflects how many blocks those invalid rows come from.

Referring to FIG. 6 for example, an update made by transaction TX1 with a new value for R1C1 may be journaled in journal 662, instead of directly updating R1C1 within column vector 220 of IMCU 600. When the update to R1C1 is journaled, its corresponding entry within column vector 220 is marked as invalid using, for example, changed-row bitmap 606. When an entry within column vector 220 within IMCU 600 is marked as invalid, the database server increments the invalidity counters of IMCU 600. According to one embodiment, each IMCU has its own invalidity counters.

Specifically, when R1C1 is invalidated, a row invalidity counter for IMCU 600 is incremented and a block invalidity counter for IMCU 600 is incremented. Subsequent updates to R1C1 do not cause either of the invalidity counters of IMCU 600 to be incremented again, because such subsequent updates do not increase the number of invalid rows of IMCU 600, nor the number of disk blocks those invalid rows come from.

After updating R1C1, assume that an update is made to R2C1. As illustrated in FIG. 2B, R2C1 belongs to the same block (block 202) as R1C1. Consequently, the update to R2C1 causes the row invalidity counter of IMCU 600 to be incremented, but does not cause the block invalidity counter of IMCU 600 to be incremented. The row invalidity counter is incremented because R1C1 and R2C2 are from different rows (shown as R1 and R2 in FIG. 2A), but the block invalidity counter is not incremented because R1C1 and R2C2 occupy the same block 202.

Access Counters

To prioritize IMCU repopulation operations, access counters are maintained for each IMCU. An access counter indicates an amount of demand for data within an IMCU. As such, the access counter may have some significance as to exposing an impact of a particular IMCU on database system throughput. For example, a heavily used IMCU is more likely to affect system throughput than a seldom used IMCU.

According to one embodiment, for any given IMCU, an access counter measures how many times the IMCU has been accessed for reading. For example, a database server may increment the access counter whenever the IMCU is scanned or otherwise read during processing of a query or other data manipulation command. In an embodiment, an IMCU has one access counter that counts scans and another access counter for other reads that involve the IMCU. Because writes that are associated with an IMCU are counted by an invalidity counter, writes are not counted by an access counter.

Repopulation Priority

According to embodiments, database systems that store data items in IMCUs prioritize IMCU population based on a variety of factors. These factors may be weighed to determine a priority for repopulation of an IMCU (hereafter referred to as "repopulation priority" or simply "priority"). The repopulation priority of an IMCU may be a numeric score that indicates how urgent repopulation of the IMCU is relative to repopulation of other IMCUs. The score can take into account a variety of factors including, for example, how stale are the contents of the IMCU. For example, the priority of an IMCU may be based on the invalidity counters and access counters of the IMCU.

Figure 7:
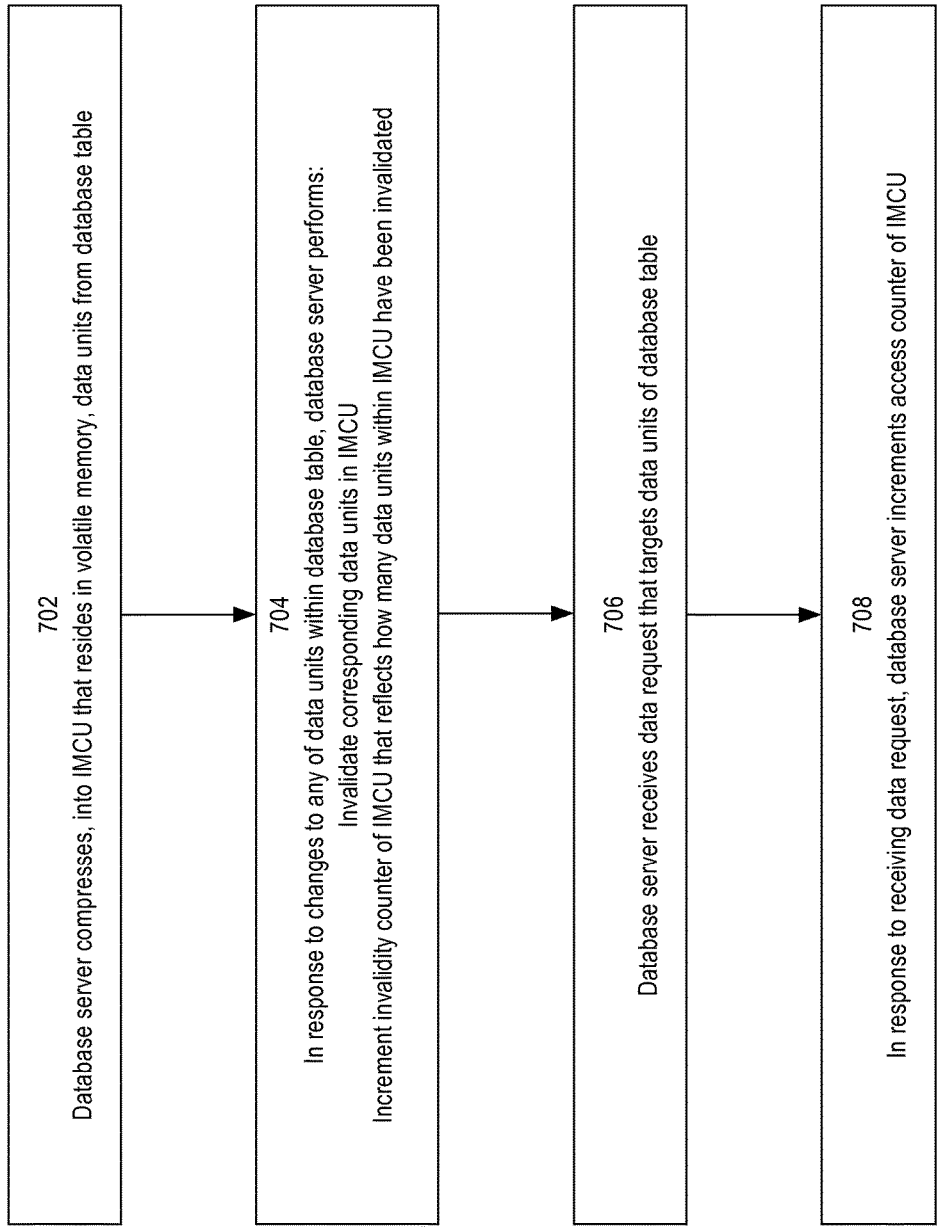
FIG. 7 is a flowchart illustrating steps for maintaining information that may be used to determine IMCU priority, according to an embodiment.

A method for maintaining information used in determining IMCU priority, according to an embodiment, is depicted in the flowchart of FIG. 7. This method may be used with an IMCU, whether created during a repopulation or during an initial population.

Step 702 is preparatory. A database server fills a new IMCU with data from a database table. For example, the database server allocates volatile memory to store the new IMCU, including enough memory to store the data content of the IMCU, perhaps in compressed form. The database server may fill the IMCU with data taken directly from disk, from a cache, from a stale IMCU, from a journal, or a combination of these. The result of step 702 is a valid IMCU with recent data. The database system may also create an SMU that is associated with the IMCU and that may contain validity counters and access counters of the IMCU. Because the IMCU is new and not yet used, its validity counters and access counters are zeroed.

Steps 704 and 706 may occur repeatedly and in various orderings. In step 704, the IMCU becomes stale. A stale IMCU is one that contains invalid data. For example, the database server may receive an update request to write new values into the database table that is associated with the IMCU. The database server may journal the changes and increment appropriate invalidity counters of the IMCU.

In step 706, the database server receives a request to read data that is backed by the database table. Because the database table is associated with the IMCU, the database server determines whether the read request can be satisfied partly or entirely with data from the IMCU. For example, a request to read a single value that is journaled can be fulfilled without using the contents of the IMCU. Regardless of whether the IMCU is actually used to fulfill the read request, in step 708, the database system increments the access counter of the IMCU to indicate demand for data that is associated with the IMCU.

Priority Queue

According to one embodiment, rather than perform IMCU repopulation operations within the critical path of transaction processing (which would increase transaction latency), repopulation operations are delayed until the database system is not busy with transaction processing or at least until a microprocessor has spare bandwidth, such as an idle core. Repopulation operations that are not part of the critical path of a transaction are said to occur "in the background."

Background repopulation may cause a backlog of stale IMCUs that need repopulation. According to one embodiment, this backlog of IMCUs is represented by a queue, where the position within the queue of any record is dictated by the repopulation priority of the IMCU that corresponds to the record. For example, within the queue, the record for IMCU X would be ahead of the record for IMCU Y, if repopulation of IMCU X has higher priority than repopulation of IMCU Y.

Priority Threshold

In the ideal case, whatever metric a database system uses for repopulation priority, in the background the database system would be able to poll the priority queue to find the highest priority IMCU and process that IMCU now, and then repeat. To facilitate such polling, the priority queue may be sorted according to the repopulation priorities of the queued IMCUs.

According to one embodiment, the repopulation priority of an IMCU may change dynamically. In response to such changes, the position of the corresponding record in the priority queue may shift dynamically.

For example, the priority queue may contains a record for a particular IMCU whose repopulation is initially assigned a low-priority. However, the priority for repopulation of that IMCU may dynamically increase due to continued updates. As a consequence of such dynamic repopulation priority changes, the records in the priority queue may need resorting.

According to one embodiment, the cost models used for prioritizing the repopulation of IMCUs are sufficiently complex and dependent on so many concurrent operations that maintaining proper sorting of such a priority queue is not feasible because of limited microprocessor bandwidth. For example during a heavy transaction load, the IMCUs that already have entries on the priority queue may experience frequent recalculations of their priorities, thereby requiring resorting of the priority queue. Performance may degrade if a database system spends so much time resorting a priority queue such that there is no spare processing bandwidth remaining to perform repopulation.

To get around this problem, the database system avoids queuing a stale IMCU until the priority score for the IMCU exceeds a threshold. According to an embodiment, every time an operation changes the repopulation priority for a given IMCU (be it a scan or DML), the database system checks to see if the repopulation priority for that particular IMCU has been pushed over a certain threshold. If the threshold has been met, the database system queues that particular IMCU for repopulation. Potentially this threshold can depend on attributes of the database table that stores the data items from which the IMCU is populated. Such table-specific attributes may include a user-specified priority or a compression level.

Repopulation Formula

According to one embodiment, a database system may employ the following logic to determine when to perform an event relating to repopulating an IMCU. Both formulas involve calculating a repopulation priority and determining whether or not the repopulation priority exceeds a threshold. Specifically, a database system may use the following formulas to decide when an IMCU has become sufficiently stale to merit a repopulation event.

Stale Row Formula:

$$((sc*(ir/tr)*sf)>=pr) ==> \text{trigger event}$$

The parameters referred to in the stale row formula are as follows:
- ir: number of invalid rows in the IMCU
- tr: total number of rows in the IMCU
- sc: number of times this IMCU was scanned
- sf: scale factor (default 100)
- pr: inmemory_repopulate_priority_threshold_row (default 160)

Stale Block Formula:

$$((sc*(ib/tb)*sf)>=pb) ==> \text{trigger event}$$

The parameters referred to in the stale block formula are as follows:
- ib: number of invalid blocks in the IMCU
- tb: total number of blocks in the IMCU
- sc: number of times this IMCU was scanned
- sf: scale factor (default 100)
- pb: inmemory_repopulate_priority_threshold_block (default 320)

The repopulation event that is triggered based on these formulas may vary from implementation to implementation. For example, a database system may use these formulas to trigger events such as (a) immediate repopulation of the IMCU, (b) queueing the IMCU in the priority queue, or (c) recalculating the repopulation priority and dynamically adjusting the position of the IMCU within the priority queue based on the newly recalculated repopulation priority.

The formulas given above are merely examples of formulas that may be used by a database server to determine when the trigger events relating to IMCU repopulation. Thus alternative embodiments may use other formulas and other parameters. These and other parameters that may be used as factors by a database system in determining when to trigger an IMCU repopulation event are discussed in greater detail hereafter. It should be noted that the repopulation formulas given above are merely examples of repopulation formulas that may be used, and embodiments of the invention are not limited to any particular repopulation formula.

Resource Limitations

Of course, any repopulation policy is subject to resource limitations for repopulation. Techniques are described hereafter for reducing the amount of resources needed to repopulate an IMCU. As shall be described in greater detail hereafter, those techniques include the use of resource manager limits, and the parameter "inmemory_max_populate_servers".

Trickle Repopulate

In an ideal world, every IMCU with a non-zero priority will eventually get repopulated. In an embodiment that sequentially repopulates one IMCU at a time, each IMCU will have to wait until (a) its entry is at the head of the priority queue and (b) enough resources are available to perform the repopulation operation.

However, the entry of an IMCU will never reach the head of the priority queue if no entry for the IMCU is ever placed in the priority queue. Thus, if the repopulation priority of an IMCU never reaches the priority threshold necessary for getting placed in the priority queue, then the IMCU will never be repopulated despite the IMCU being stale.

To address this problem, a trickle repopulate technique has been developed. In general, trickle repopulate involves devoting a small amount of resources to repopulating IMCUs regardless of the repopulation priority of the IMCUs. Since the IMCUs whose repopulation priority has already reached the repopulate threshold have already been queued, this means trickle repopulate will only occur for IMCUs whose repopulation priorities have yet to reach the threshold.

According to one embodiment, trickle repopulate examines each IMCU, one at a time. If trickle repopulate determines that the repopulation priority of an IMCU is zero, such as when the invalidity counters of the IMCU are zeroed, then trickle repopulate does not process the IMCU because it does not need repopulation. If trickle repopulate determines that an IMCU has a nonzero repopulation priority that exceeds a priority threshold for repopulation queueing, then trickle repopulate does not process the IMCU because the IMCU is in the priority queue and will eventually be repopulated by the primary repopulation process that uses the priority queue to select IMCUs for repopulation. When trickle repopulate encounters an IMCU that has a nonzero repopulation priority that is less than the priority threshold, then trickle repopulate performs repopulation of the IMCU. Because primary repopulation process repopulates stale IMCUs that are in the priority queue, and trickle repopulate repopulates stale IMCUs that are not in the priority queue, eventually all IMCUs with non-zero priority will be repopulated. Trickle repopulation may occur in the background. Given sufficient time for trickle repopulation, eventually all IMCUs will be restored to a current state, with no invalid rows.

Priority Based on Cost and Benefit

The formulas discussed above may be used to determine when to place an entry for an IMCU in the priority queue. However, the actual priority that is assigned to the repopulation of an IMCU may take into account a variety of other factors. According to one embodiment, repopulation priority depends on measured performance statistics that depend on attributes of the IMCU. In general, repopulation priority for an IMCU may be based on a repopulate benefit B (the performance increase that will result from repopulating the IMCU) divided by a repopulate cost R (the overhead associated with performing the repopulation operation). In general, the repopulation priority (P) of an IMCU may be calculated as P=B/R.

Repopulate Cost

In embodiments, the database system assumes the cost R is proportional to either the number of rows in the IMCU or the size of the IMCU. In a sophisticated embodiment, the database system may also take into account the compression level, since the database system repopulates more slowly at higher compression levels. According to one embodiment, the formula:

$$R=IMCU\_uncomp\_size/repop\_speed$$

is used to very quickly generate an estimate on the cost or repopulating an IMCU. In this formula:
  IMCU_uncomp_size is the size of the IMCU before compression, and
  repop_speed is the rate at which repopulation of an IMCU can occur for a given amount of data.

In one embodiment, repop_speed is constant. However, in alternative embodiments, the database system can change repop_speed to depend on compression level. For example, creating a replacement IMCU during repopulation may or may not involve performing data compression. If repopulation takes twice as long when compression is performed, then repop_speed should be halved when calculating the repopulation cost of an IMCU that will receive compression.

Another option is to use the measured cost of the last repopulate, which the database system may have already stored in the IMCU itself or elsewhere. For example, the database system may measure how much time elapsed during the previous repopulation of an IMCU and store the time measurement in the SMU of the IMCU. If the IMCU later becomes stale, the database system may refer to the time measurement as a cost estimate of future repopulation, without the mathematical overhead normally associated with calculating a cost estimate.

The accuracy of a previously measured cost as a future cost estimate depends on the amount of data corresponding to an IMCU not varying excessively. If the number of rows that correspond to the IMCU has changed significantly due to journaled inserts, then the database system scales the previously measured cost accordingly. For example if, due to inserts, the amount of data to be stored in an IMCU has doubled since the last measurement of repopulation cost of the IMCU, then the measured cost should also be doubled to preserve the accuracy of the measurement as an estimate of future cost.

Incremental Repopulation

Repopulation involves creating a new IMCU and populating it with data items that are more up-to-date. Depending on from where the recent contents are available, repopulation may involve either outright replacement with the recent contents or selectively merging portions of the recent contents with portions of a stale IMCU. For example, if invalid rows of the stale IMCU have corresponding recent data available in a journal, then repopulation may be accomplished by merging valid portions of the stale IMCU with additional content taken from the journal to achieve a combined content that is current in the new IMCU. This technique of merging recent data with the content of a stale IMCU is referred to as "incremental repopulation."

However, cost estimation of incremental repopulation involves additional factors because the amount of journaled data to be merged into the new IMCU is variable. Using previously measured repopulate times is more difficult, since they are very dependent on the number of changes. Because of that, a more accurate incremental repopulation cost formula is:

$$R=old\_IMCU\_uncomp\_size/repop\_from\_old\_speed+ delta\_size/merge\_speed$$

repop_from_old_speed is how fast database system can copy/translate data from the old IMCU,
  delta_size is the estimated size of the delta that needs to be merged from a cache block or a disk block into the new IMCU, and
  merge_speed is the speed at which database system can copy/merge the delta into the new IMCU.

According to one embodiment, the delta_size parameter is instead taken into account in the benefit calculations given later herein. Thus, the database system can approximate the incremental repopulate cost as:

$$R=old\_IMCU\_uncomp\_size/repop\_from\_old\_speed$$

When this formula is used, the database system now has repop_from_old_speed rather than repop_speed. The latter should be much greater than the former, because of the added cost of merging the delta into the new IMCU. If the database system parametrizes repop_speed, incremental repopulate may merely involve adjusting that parameter to take into account this difference in cost between populating a new IMCU directly from a memory block with current data and populating a new IMCU by merging the contents of an old IMCU with changes from a cache block or a disk block.

Repopulate Benefit

As mentioned above, repopulation priority P of an IMCU may be calculated as B/R, where B is the performance benefit expected from repopulating the IMCU. According to one embodiment, the benefit B is defined as the number of seconds saved by repopulating. According to one embodiment, in calculating the benefit B, the database server assumes that this benefit is proportional to the number of changes in the IMCU. In one embodiment, the database system factors in both row and block changes. In one embodiment, the database system does not factor in the number of scans of the IMCU that the database system has done so far. In one embodiment, the database system treats the benefit as the extra cost of doing a single scan on an IMCU due to modified rows within the IMCU. Note that this way of viewing the benefit ignores the extra complexity in the cost of scanning the IMCU itself. Because the database system does not have min/max and dictionary pruning to optimize scanning the delta rows, all delta rows must always be scanned, and so there is much less variance in the cost. Hence, the database system can without much loss of generality assume that the extra cost of IMCU scanning is constant.

As such, one embodiment uses the formula:

$$B=\text{delta\_size/delta\_scan\_speed}$$

B is the number of seconds to scan the changed rows. With the current expressions of B and R, the formula for P is:

$$P=B/R=(\text{delta\_size/IMCU\_uncomp\_size})*\\(\text{repop\_speed/delta\_scan\_speed})$$

In an embodiment, the database system normalizes the units such that (repop_speed/delta_scan_speed)=1. Assuming that repop_speed and delta_scan_speed are constant, the database system uses a threshold that triggers queing an IMCU for repopulation if a certain percentage of the rows are changed. The default threshold may be P=0.05, or 5% of the rows.

This particular formula does not take into account the number of scans of the IMCU. To address this, the database system can use an enhanced cost formula that also measures the number of scans since the last repopulate. The enhanced cost formula may trigger repopulation when the database system increments the number of scans of the IMCU from within the scan code path as well as when the database system increments the changed rows count of the IMCU from within the DML code path.

The database system can simplify the repopulation-triggering statistics by assuming that the scans are evenly spread across many DML transactions, so that the average scan scans delta_size/2 worth of data. Then the benefit formula is:

$$B=\text{num\_scans}*(\text{delta\_size}/2)/\text{delta\_scan\_speed}$$

That gives:

$$P=\text{num\_scans}*(\text{delta\_size/IMCU\_uncomp\_size})*\\(\text{repop\_speed/delta\_scan\_speed})/2$$

This priority equation is the same as above, except that the threshold takes into account both the percentage of rows changed as well as the number of scans. Again, normalizing for constants as above, the database system can treat the priority of an IMCU as being proportional to the number of scans times the percentage of data changed.

In an embodiment where the database system already tracks the number of rows and blocks modified in the SMU. The database system can get:

$$\text{delta\_size}=\text{IMCU\_uncomp\_size}*(\text{number\_of\_}\\\text{rows\_modified/IMCU\_rows})$$

Substituting Produces the Formula of:

$$P=\text{num\_scans}*(\text{number\_of\_rows\_modified/IM-}\\\text{CU\_rows})*(\text{repop\_speed/delta\_scan\_speed})/2$$

In an embodiment, the database system can determine Repopulation priority based on blocks modified for an IMCU. The values for repop_speed and delta_scan_speed can be constants. In one embodiment, the database system may consider repop_speed as dependent on the compression level or based on the initial time of population, which the database system may track separately from the time taken for the last repopulation.

Parameters to Control Repopulate Policy

The tunable parameters used to control repopulation, according to one embodiment, are described in detail hereafter. One embodiment uses the following existing parameters for percentage of row/block changes, with default values:
_inmemory_repopulate_threshold_rows_percent=5
_inmemory_repopulate_threshold_blocks_percent=10

The _inmemory_repopulate_threshold_rows_percent corresponds to 100*(number_of_rows_modified/IMCU_rows) in the above formula for P. In this very simple formula, database system assumes P is proportional to this ratio with the repopulation threshold determined by the _inmemory_repopulate_threshold_rows_percent parameter.

In another embodiment, the formulas proposed above instead use the following parameters:
_inmemory_invalid_scan_to_repopulate_ratio=delta_scan_speed/repop_speed (assuming the ratio can be approximated by an integer.)
_inmemory_repopulate_priority_threshold_row
_inmemory_repopulate_priority_threshold_block The _inmemory_repopulate_priority_threshold_row and _inmemory_repopulate_priority_threshold_block parameters replace the row and block parameters defined above, but in terms of priority P defined above. Preferably, these thresholds are integers, because integer arithmetic executes faster than floating point arithmetic. To get around the problem of priorities being less than one, and possibly being rounded down to zero, the database system can use a sufficiently large scale factor to multiply the calculated priority by before comparing with the threshold, which may be parametrized:
_inmemory_repopulate_priority_scale_factor In an alternative embodiment, the _inmemory_invalid_scan_to_repopulate_ratio factor is eliminated, and incorporated into the scale factor parameter.

In such an embodiment, the formula for P is:
$$P=\text{num\_scans}*(\text{number\_of\_rows\_modified/IMCU\_rows})*\\\text{scale\_factor}$$

The scale factor takes into account the scan and repopulate speeds, which do not need separate parameterization. The database system can use different scale factor parameters for different compression levels, since compression levels have different repopulate speeds. The database system could also use a second scale factor based on the user-specified priority of the table that backs the IMCU. In an embodiment, the default scale factor may be 100, so that the priority becomes:

$$P=\text{num\_scans}*\text{percent\_of\_rows\_modified}$$

Preventing Too Frequent Repopulates

With these formulas, the repopulation priority could continually hit the threshold for the same IMCU. To avoid consuming too many resources on constantly repopulating the same IMCU, the database system may use the parameter _inmemory_repopulate_threshold_mintime_factor to throttle the frequency of repopulates in this case.

A value n for this parameter indicates not to spend more than 1/n of the time repopulating the same IMCU. In an embodiment, once a given IMCU has reached the threshold, the database system will not actually start repopulating the IMCU until the current time minus the last repopulate time is at least n times the amount of time taken by the last (re)populate of this IMCU. Both the timestamp when the IMCU was last repopulated and the amount of time that repopulate took may be stored in the IMCU header, so the database system has enough information to make this decision. In an embodiment, the default value is 5.

Taking into Account IMCU Unavailability During Repopulate

The above formulas do not take into account the fact that in an embodiment the IMCUs are unavailable while repopulating. Hence the database system has to go to the buffer cache for all rows, and not just for the changed rows. This is essentially a negative scan benefit, so the database system should calculate the additional work for these scans while repopulating and subtract it from B. This can be modelled simply as:

Neg_$B$=num_scans_while_repop* IMCU_uncomp_size/delta_scan_speed

This formula assumes that the delta scan goes to the buffer cache, so the speeds for going to the buffer cache for all rows and the delta scan are the same. Journal scans make the difference even worse. To account for this, the following substitution can be made:

num_scans_while_repop=num_scans*$R$/time_since_repop where R is the time to repopulate, as above.

Based on this substitution, the formula is now: Neg_$B$/$R$=num_scans*IMCU_uncomp_size/ (delta_scan_speed*time_since_repop)=num_scans* (time_to_repop*repop_speed)/ (delta_scan_speed*time_since_repop)  P_new=P−Neg_$B$/$R$=num_scans*((repop_speed/delta_scan_speed)/2)* ((number_of_rows_modified/IMCU_rows)−2* (time_to_repop/time_since_repop))

This formula is basically the same as before, but the database system subtracts out twice the ratio of the time to repopulate to the time since the last repopulation from the percentage of invalid rows. Using this model and the abbreviations corresponding to parameters from the summary above, the threshold then becomes:

($sc$*(($ir$/$tr$)−2*(time_to_repop/time_since_ repop))*$sf$)>=$pr$

These changes could integrate easily into the formulas presented earlier herein, since the database system already measures time_to_repop and time_since_repop and checks them for the _inmemory_repopulate_threshold_mintime_ factor parameter mentioned above.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
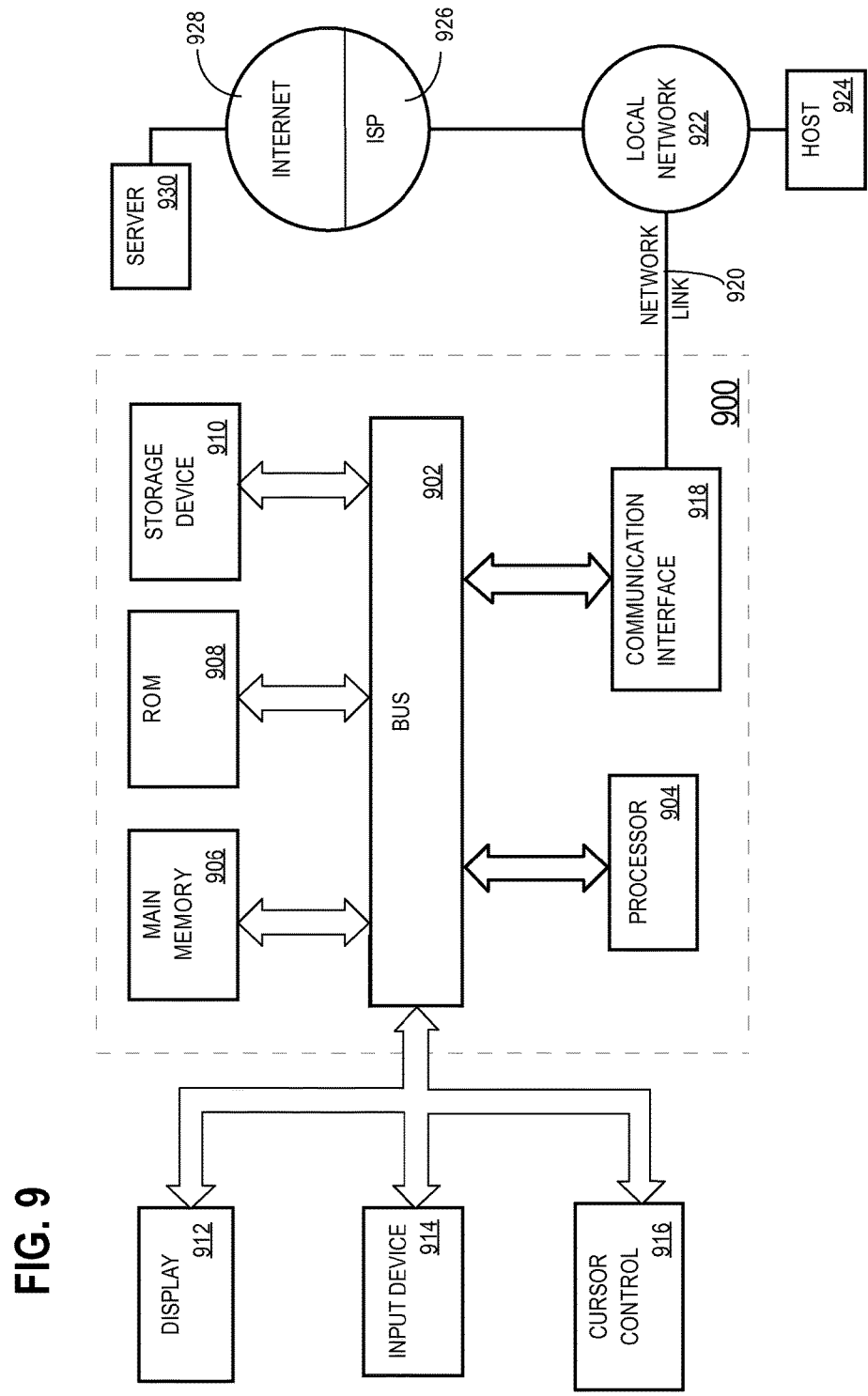
FIG. 9 is a block diagram illustrating a computer system that may be used to implement the techniques described herein.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for prioritizing repopulation of in-memory compression units (IMCU), the method comprising:
   a database server compressing, into an IMCU that resides in volatile memory of a computing device, a plurality of data units from a database table;
   wherein the database server is executing on the computing device;
   in response to changes to any of the plurality of data units within the database table, the database server performing the steps of:
   invalidating corresponding data units in the IMCU;
   incrementing an invalidity counter of the IMCU that reflects how many distinct and separate data units within the IMCU have been invalidated;
   the database server receiving a data request that targets one or more of the plurality of data units of the database table;
   in response to receiving the data request, the database server incrementing an access counter of the IMCU;
   the database server determining a priority for repopulating the IMCU based, at least in part, on the invalidity counter and the access counter;
   determining, based on the priority for repopulating the IMCU and a second priority determined for a second IMCU, whether to repopulate the IMCU before the second IMCU; and
   repopulating the IMCU before repopulating the second IMCU, based on determining that repopulation of the IMCU is likely to improve performance more than repopulation of the second IMCU.

2. The method of claim 1 further comprising:
   the database server determining an invalidity proportion based on the invalidity counter, wherein the invalidity proportion reflects a proportion of data units within the IMCU that are invalid; and
   wherein determining a priority for repopulating the IMCU is based, at least in part, on the invalidity proportion.

3. The method of claim 2 wherein determining priority for repopulating the IMCU includes the database server queueing the IMCU for later repopulation in response to the access counter, scaled by the invalidity proportion, exceeding a threshold.

4. The method of claim 3 wherein later repopulation comprises repopulation occurring after at least a delay proportional to a duration of a previous repopulation of the IMCU.

5. The method of claim 1 wherein:
   determining a priority for repopulating the IMCU comprises:
   the database server assigning the IMCU a priority; and
   the database server inserting a queue entry for the IMCU into a priority queue based on the priority; and
   the method further comprises the database server repopulating IMCUs in an order that is based on order of queue entries in the priority queue.

6. The method of claim 5 wherein repopulating IMCUs comprises the database server incrementally repopulating the IMCU.

7. The method of claim 5 wherein the priority comprises a ratio of a repopulation benefit to a repopulation cost.

8. The method of claim 7 wherein:
assigning the IMCU a priority comprises the database server determining an uncompressed size of all data within the IMCU; and
the repopulation cost comprises a ratio of the uncompressed size to a repopulation speed.

9. The method of claim 8 wherein the repopulation speed comprises a value based on a compression level.

10. The method of claim 8 wherein determining an uncompressed size comprises the database server determining an uncompressed size of a previous repopulation of the IMCU.

11. The method of claim 8 wherein the repopulation speed comprises an efficient repopulation speed based on copying data already within the IMCU.

12. The method of claim 11 wherein assigning the IMCU a priority comprises the database server determining a size of data to merge into the IMCU to repopulate the IMCU with current data.

13. The method of claim 12 wherein the efficient repopulation speed comprises a ratio of the size of data to merge to a speed of copying data already within the IMCU.

14. The method of claim 12 wherein the size of data to merge comprises an amount of data units to merge into the IMCU.

15. The method of claim 12 wherein:
the method further comprises the database server determining an invalidity proportion based on the invalidity counter; and
the size of data to merge comprises the uncompressed size scaled by the invalidity proportion.

16. The method of claim 7 wherein:
assigning the IMCU a priority comprises the database server determining a size of data to merge into a new IMCU from a data block;
the repopulation benefit comprises a ratio of the size to a scan duration of a scan of the IMCU.

17. The method of claim 16 wherein the repopulation benefit is further scaled by half of an amount of scans of the IMCU since a previous repopulation.

18. The method of claim 16 wherein the repopulation benefit is further reduced by an amount of scans of the IMCU scaled by the ratio of an uncompressed size of all data within the IMCU to a scan speed.

19. The method of claim 18 wherein the amount of scans comprises an amount of scans of the IMCU since a previous repopulation.

20. The method of claim 18 wherein the amount of scans comprises an amount of scans of the IMCU since a previous repopulation scaled by a ratio of the repopulation cost to duration since the previous repopulation.

21. The method of claim 7 wherein the repopulation cost comprises a measured duration of a previous repopulation of the IMCU.

22. The method of claim 21 wherein the measured duration is scaled by an inverse of time since the previous repopulation.

23. The method of claim 5 wherein:
the method further comprises the database server determining an invalidity proportion based on the invalidity counter; and
the priority comprises an amount of scans of the IMCU since a previous repopulation of the IMCU scaled by the invalidity proportion.

24. A non-transitory storage media storing instructions which, when executed by a database server, cause:
the database server compressing, into an IMCU, a plurality of data units from a database table;
in response to changes to any of the plurality of data units within the database table, the database server performing:
invalidating corresponding data units in the IMCU; and
incrementing an invalidity counter of the IMCU that reflects how many distinct and separate data units within the IMCU have been invalidated;
the database server receiving a data request that targets one or more of the plurality of data units of the database table;
in response to receiving the data request, the database server incrementing an access counter of the IMCU;
the database server determining a priority for repopulating the IMCU based, at least in part, on the invalidity counter and the access counter;
determining, based on the priority for repopulating the IMCU and a second priority determined for a second IMCU, whether to repopulate the IMCU before the second IMCU; and
repopulating the IMCU before repopulating the second IMCU, based on determining that repopulation of the IMCU is likely to improve performance more than repopulation of the second IMCU.

25. A database server system configured to prioritize repopulation of IMCUs, and comprising:
a memory comprising an IMCU;
a processor coupled to the memory;
a processor logic coupled to the memory and the processor, and configured to:
compress, into the IMCU, a plurality of data units from a database table;
in response to changes to any of the plurality of data units within the database table, perform:
invalidating corresponding data units in the IMCU; and
incrementing an invalidity counter of the IMCU that reflects how many distinct and separate data units within the IMCU have been invalidated;
receive a data request that targets one or more of the plurality of data units of the database table;
in response to receiving the data request, increment an access counter of the IMCU;
determine a priority for repopulating the IMCU based, at least in part, on the invalidity counter and the access counter;
determining, based on the priority for repopulating the IMCU and a second priority determined for a second IMCU, whether to repopulate the IMCU before the second IMCU; and
repopulating the IMCU before repopulating the second IMCU, based on determining that repopulation of the IMCU is likely to improve performance more than repopulation of the second IMCU.

* * * * *

UNITED STATES PATENT AND TRADEMARK OFFICE
CERTIFICATE OF CORRECTION

PATENT NO. : 10,007,691 B2
APPLICATION NO. : 14/823393
DATED : June 26, 2018
INVENTOR(S) : Gleeson et al.

Page 1 of 1

It is certified that error appears in the above-identified patent and that said Letters Patent is hereby corrected as shown below:

In the Specification

In Column 1, Line 3, Above "FIELD OF THE INVENTION" insert -- CROSS-REFERENCE TO RELATED APPLICATIONS; BENEFIT CLAIM This application claims the benefit of U.S. Provisional Application No. 62/054,970, filed September 24, 2014, the entire contents of which is hereby incorporated by reference as if fully set forth herein, under 35 U.S.C. §119(e). --.

In Column 9, Line 28, after "data)" insert -- . --.

In Column 13, Line 32, after "row" insert -- . --.

In Column 31, Line 22, delete "queing" and insert -- queuing --, therefor.

Signed and Sealed this
Eighteenth Day of June, 2019

Andrei Iancu
*Director of the United States Patent and Trademark Office*